US011741994B2

(12) United States Patent
Akiyoshi et al.

(10) Patent No.: US 11,741,994 B2
(45) Date of Patent: Aug. 29, 2023

(54) IMAGE CAPTURE DEVICE, RECORDING DEVICE, AND DISPLAY CONTROL DEVICE

(71) Applicant: CANON KABUSHIKI KAISHA, Tokyo (JP)

(72) Inventors: Hidenobu Akiyoshi, Tokyo (JP); Toru Kobayashi, Tokyo (JP); Akihiro Tanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/701,198

(22) Filed: Mar. 22, 2022

(65) Prior Publication Data

US 2022/0215859 A1 Jul. 7, 2022

Related U.S. Application Data

(63) Continuation of application No. 16/943,863, filed on Jul. 30, 2020, now Pat. No. 11,308,991, which is a continuation of application No. PCT/JP2019/002068, filed on Jan. 23, 2019.

(30) Foreign Application Priority Data

Feb. 16, 2018 (JP) .................................. 2018-026307

(51) Int. Cl.
*G11B 20/00* (2006.01)
*G11B 20/12* (2006.01)
*G11B 27/00* (2006.01)
*H04N 19/70* (2014.01)
*H04N 19/85* (2014.01)
*H04N 5/93* (2006.01)

(52) U.S. Cl.
CPC ........ *G11B 20/12* (2013.01); *G11B 20/00007* (2013.01); *H04N 19/70* (2014.11); *H04N 19/85* (2014.11); *G11B 2020/00072* (2013.01)

(58) Field of Classification Search
USPC .......................... 386/278, 280, 282, 326, 335
See application file for complete search history.

(56) References Cited

U.S. PATENT DOCUMENTS

| 2008/0165861 A1* | 7/2008 | Wen ..................... H04N 19/176 375/E7.176 |
| 2013/0229546 A1 | 9/2013 | Furumura et al. |
| 2015/0237322 A1* | 8/2015 | Stec ........................ H04N 11/24 348/453 |

FOREIGN PATENT DOCUMENTS

| CN | 105580082 A | 5/2016 |
| CN | 107211079 A | 9/2017 |
| WO | 2015/008775 A1 | 1/2015 |

\* cited by examiner

*Primary Examiner* — Daquan Zhao
(74) *Attorney, Agent, or Firm* — Canon U.S.A., Inc., IP Division

(57) ABSTRACT

An image capture device for recording HDR (high dynamic range) image data obtained through image capture performs control so as to, when encoding HDR image data obtained by capturing an image with an image sensor, divide part of the HDR image data corresponding to a coding area to be encoded into a plurality of divided HDR image data, encode each of the plurality of divided HDR image data by using encoding means, and record the plurality of divided HDR image data that are encoded on a recording medium in a predetermined recording format.

15 Claims, 13 Drawing Sheets

FIG. 2

| 'ftyp' | | | | File Type Box |
|---|---|---|---|---|
| 'meta' | | | | Metadata Box |
| | 'hdlr' | | | Handler Box |
| | 'dinf' | | | Data information Box |
| | | 'dref' | | Data Reference |
| | | | 'url' | DataEntryURLBox |
| | 'pitm' | | | Primary Item Box |
| | 'iinf' | | | Item information Box |
| | | 'infe' | | Item Information Entry of Coded Image 1 |
| | | 'infe' | | Item Information Entry of Coded Image 2 |
| | | 'infe' | | Item Information Entry of Master Image |
| | | 'infe' | | Item Information Entry of Thumbnail Image |
| | | 'infe' | | Item Information Entry of Metadata |
| | 'iref' | | | Item Reference Box |
| | | 'dimg' | | Relationship Between Master Image and Coded Image 1/2 |
| | | 'thmb' | | Relationship Between Master Image and Thumbnail Image |
| | | 'cdsc' | | Relationship Between Master Image and Metadata |
| | 'iprp' | | | Item Properties Box |
| | | 'ipco' | | ItemPropertyContainerBox |
| | | | 'colr' | Color Space Information Regarding Master Image and Coded Images 1 and 2 |
| | | | 'hvcC' | DecoderConfigurationRecord of Coded Image 1 |
| | | | 'ispe' | Size Information Regarding Coded Image 1 |
| | | | 'pixi' | Pixel Information Regarding Master Image and Coded Image |
| | | | 'hvcC' | DecoderConfigurationRecord of Coded Image 2 |
| | | | 'ispe' | Size Information Regarding Coded Image 2 |
| | | | 'ispe' | Size Information Regarding Master Image |
| | | | 'irot' | Rotation of Master Image and Thumbnail Image |
| | | | 'CLLI' | Content Light Level Info of Master Image (HDR Static Meta) |
| | | | 'colr' | Color Space Information Regarding Thumbnail Image |
| | | | 'hvcC' | Decoder Configuration Record of Thumbnail Image |
| | | | 'ispe' | Size Information Regarding Thumbnail Image |
| | | | 'pixi' | Pixel Information Regarding Thumbnail Image |
| | | | 'CLLI' | Content Light Level Info of Thumbnail Image (HDR Static Meta) |
| | | | 'MDCV' | Mastering Display Color Volume (HDR Static Meta) |
| | | 'ipma' | | ItemPropertyAssociation |
| | | | | Index Array Of Properties of Coded Image 1 |
| | | | | Index Array Of Properties of Coded Image 2 |
| | | | | Index Array Of Properties of Master Image |
| | | | | Index Array Of Properties of Thumbnail Image |
| | 'idat' | | | Item Data Box |
| | | | | ImageOverlay Structure |
| | 'iloc' | | | Item Location Box |
| | | | | Location Information Regarding Data (HEVC) of Coded Image 1 |
| | | | | Location Information Regarding Data (HEVC) of Coded Image 2 |
| | | | | Location Information Regarding Data (ImageOverlay Structure) of Master Image |
| | | | | Location Information Regarding Data (HEVC) Of Thumbnail Image |
| | | | | Location Information Regarding Metadata (Exif Data) |
| 'mdat' | | | | Media data |
| | | | | Metadata (Exif Data) |
| | | | | Data of Thumbnail Image (HEVC) |
| | | | | Data of Coded Image 1 (HEVC) |
| | | | | Data of Coded Image 2 (HEVC) |

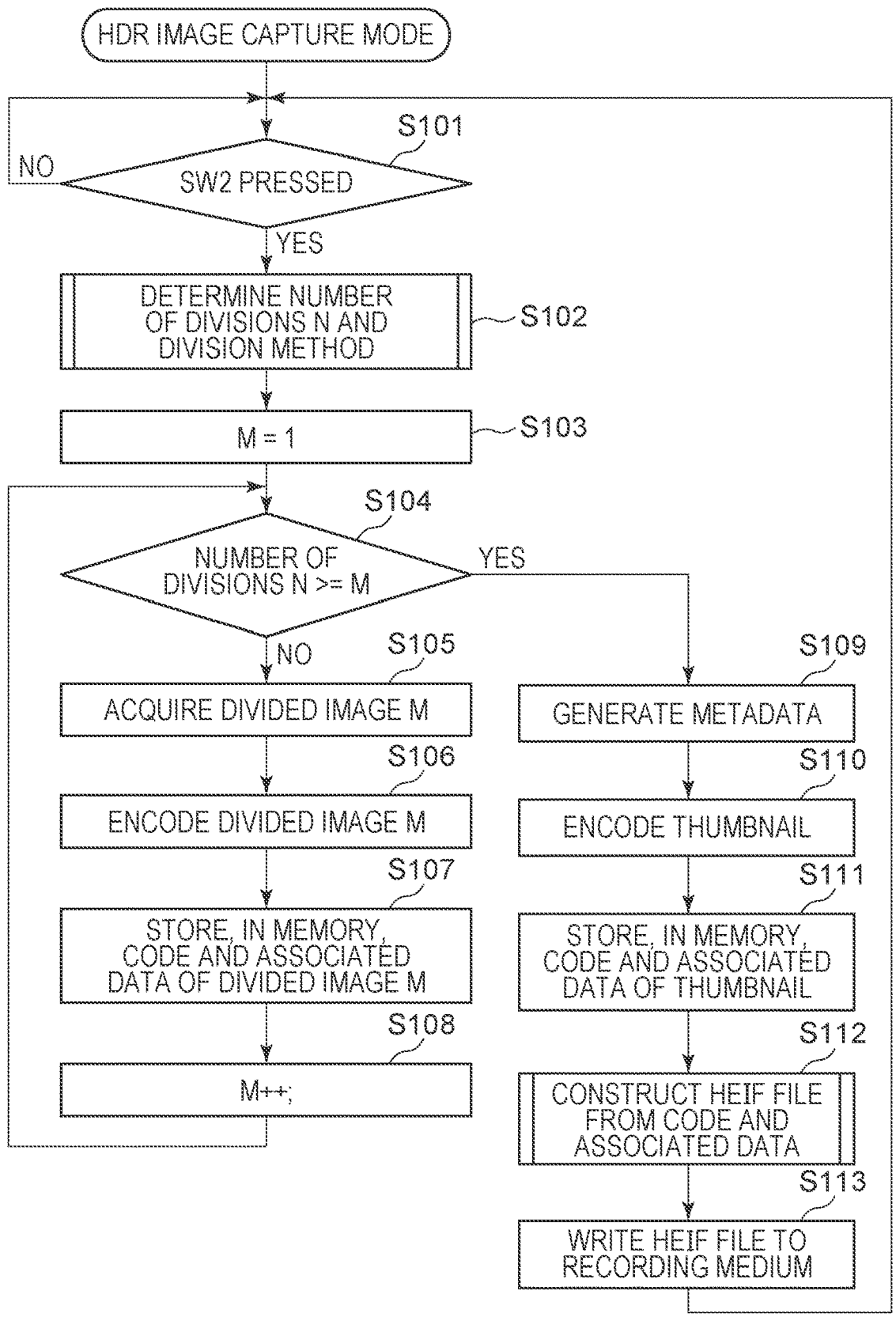

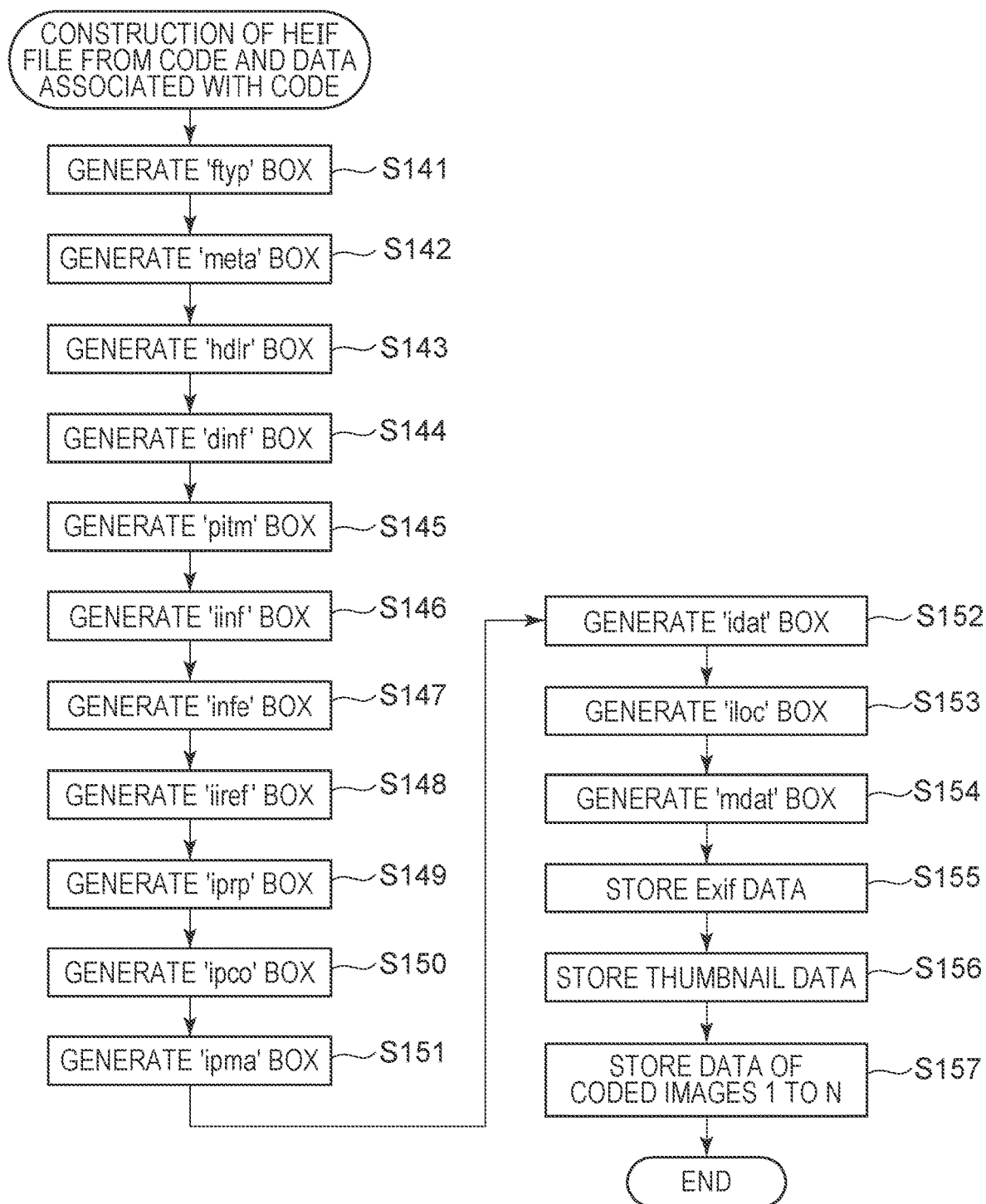

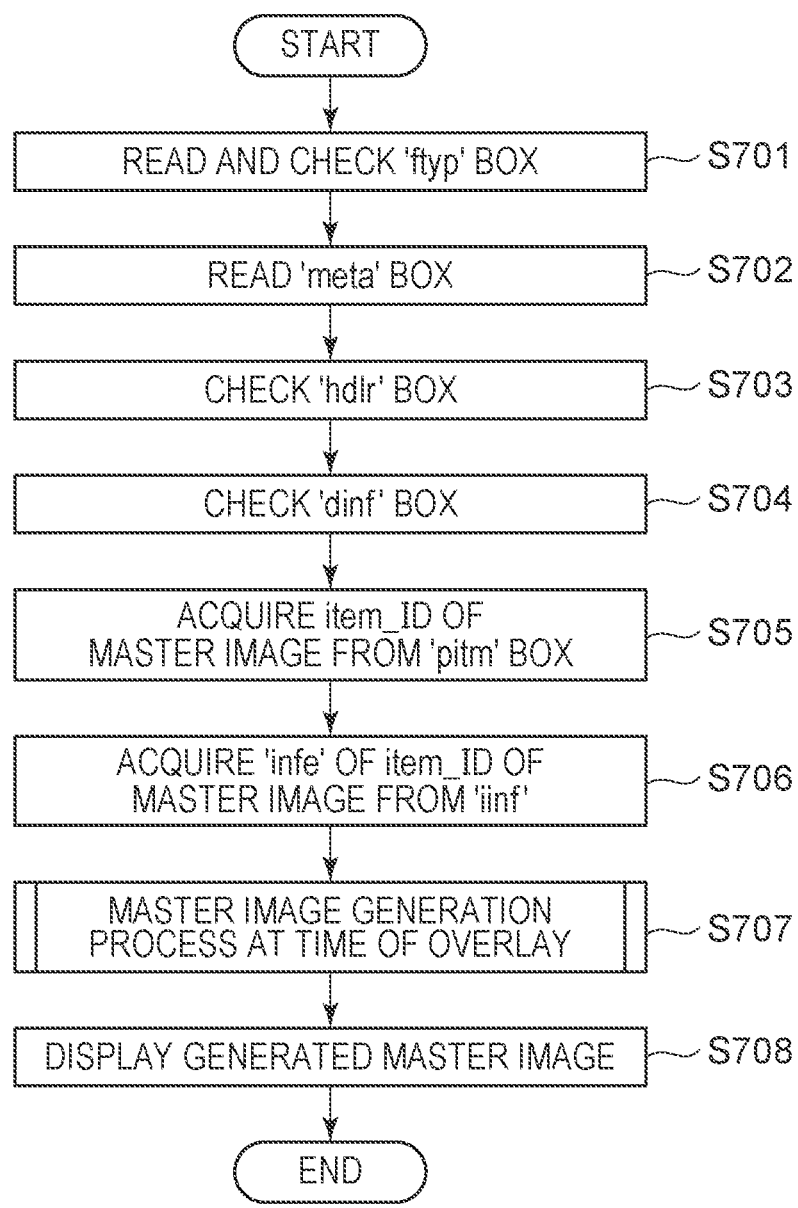

IMAGE CAPTURE DEVICE, RECORDING DEVICE, AND DISPLAY CONTROL DEVICE

CROSS-REFERENCE TO RELATED APPLICATIONS

This application is a Continuation of U.S. patent application Ser. No. 16/943,863, filed on Jul. 30, 2020, which is a Continuation of International Patent Application No. PCT/JP2019/002068, filed Jan. 23, 2019, which claims the benefit of Japanese Patent Application No. 2018-026307, filed Feb. 16, 2018, both of which are hereby incorporated by reference herein in their entirety.

TECHNICAL FIELD

The present disclosure relates to an image capture device, a recording device, and a display control device.

BACKGROUND ART

An image capture device is known that serves as an image processing device for compression-encoding image data. The image processing device acquires moving image signals by using an image capture unit, compression-encodes the acquired moving image signals, and records a compression-encoded image file on a recording medium. According to existing techniques, image data prior to compression encoding has been represented by SDR (Standard Dynamic Range), which limits the luminance level to 100 nits. However, in recent years, image data has been represented by HDR (High Dynamic Range) with an extended luminance level of up to about 10000 nits. Thus, image data having a luminance range close to the perceptible luminance range of humans has been provided.

PTL 1 describes an image data recording device that, when an HDR image is captured and recorded, generates and records image data that enables even a non HDR device to refer to the details of an HDR image.

CITATION LIST

Patent Literature

PTL 1 Japanese Patent Laid-Open No. 2017-139618

Although PTL 1 describes that an HDR image is recorded, PTL 1 does not mention an optimum method for recording an HDR image.

Accordingly, there is a need in the art to provide a device that when recording an image having a large amount of data, such as an HDR image, records the image in a recording form suitable for recording and playback. Furthermore, there is a need in the art to provide a display control device for playing back the image recorded in the recording form.

SUMMARY OF INVENTION

In order to solve the above-mentioned issues, an image capture device for recording HDR (high dynamic range) image data obtained through image capture is provided. The image capture device includes an image sensor, encoding means for encoding HDR image data obtained by capturing an image with the image sensor, and recording control means for dividing part of the HDR image data captured by the image sensor, corresponding to a coding area to be encoded, into a plurality of divided HDR image data, encoding each of the divided HDR image data by using the encoding means, and recording the plurality of encoded divided HDR image data on a recording medium in a predetermined recording format.

Furthermore, a recording device according to the present disclosure includes encoding means for encoding HDR image data obtained through image capture, and recording control means for performing control to divide image data obtained through image capture by an image sensor into a plurality of divided image data, encode each of the plurality of divided image data by using encoding means, and record the plurality of encoded divided image data in an image file having a predetermined format. The recording control means performs control to record, as an image item in the image file, overlay information used to combine the plurality of divided image data into an image before being divided.

Still furthermore, a display control device according to the present disclosure includes readout means for reading, from a recording medium, an HDR image file generated by dividing HDR image data of a coding area to be encoded into a plurality of divided HDR image data, encoding each of the plurality of divided HDR image data by using encoding means, and recording, on the recording medium, the plurality of divided HDR image data as the HDR image file in a predetermined recording format, combining means for combining the plurality of divided HDR image data included in the read out HDR file, and display control means for performing control to combine the plurality of HDR image data each decoded by decoding means and display the combined HDR image data on display means as one HDR image data.

Further features of the present disclosure will become apparent from the following description of exemplary embodiments with reference to the attached drawings.

BRIEF DESCRIPTION OF DRAWINGS

FIG. 2 is a diagram illustrating the structure of an HEIF file.

FIG. 3 is a flowchart illustrating the processing performed in an HDR image capture mode.

FIG. 6 is a flowchart illustrating a process for generating an HEIF file.

FIG. 7 is a flowchart illustrating a display process performed at the time of playback of HDR image data recorded as an HEIF file.

DESCRIPTION OF EMBODIMENTS

Embodiments of the present disclosure are described in detail below with reference to the accompanying drawings and an image capture device 100 as an example. Note that the present disclosure is not limited to the following embodiments.

Configuration of Image Capture Device

Figure 1:
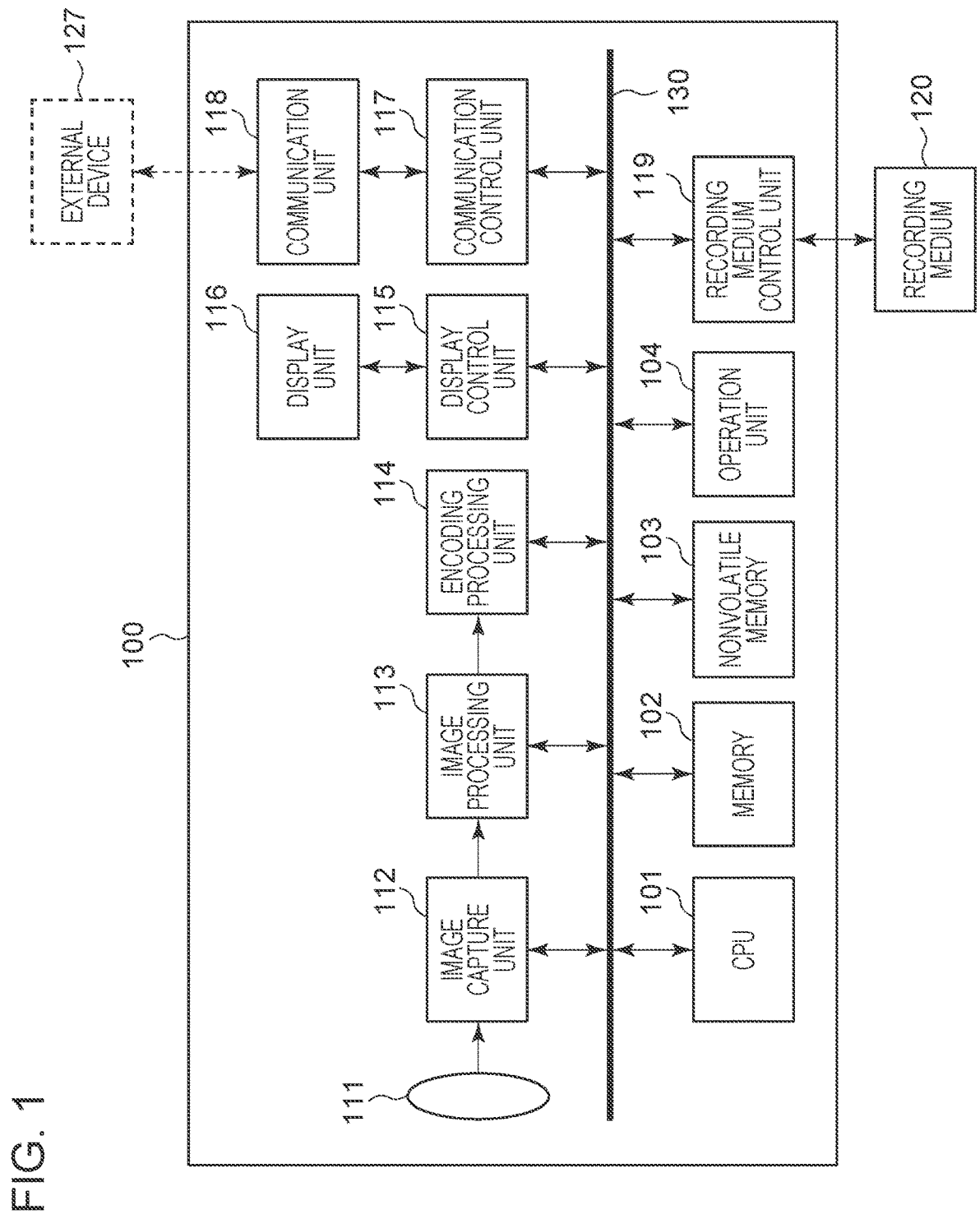
FIG. 1 is a block diagram illustrating the configuration of an image capture device 100.

FIG. 1 is a block diagram illustrating the image capture device 100. As illustrated in FIG. 1, the image capture device 100 includes a CPU 101, a memory 102, a nonvolatile memory 103, an operation unit 104, an image capture unit 112, an image processing unit 113, an encoding processing unit 114, a display control unit 115, and a display unit 116. Furthermore, the image capture device 100 includes a communication control unit 117, a communication unit 118, a recording medium control unit 119, and an internal bus 130. The image capture device 100 forms an optical image of an object on a pixel array of the image capture unit 112 by using an image capture lens 111. The image capture lens 111 may be removable or non-removable from the body (the housing or main body) of the image capture device 100. In addition, the image capture device 100 writes and reads image data to and from a recording medium 120 via the recording medium control unit 119. The recording medium 120 may be removable or non-removable from the image capture device 100.

The CPU 101 is one or more processors. The CPU 101 executes a computer program stored in the nonvolatile memory 103 to control the operation performed by each of the units (each of functional blocks) of the image capture device 100 via the internal bus 130.

The memory 102 is a rewritable volatile memory. The memory 102 temporarily records a computer program for controlling the operation performed by each unit of the image capture device 100, information such as parameters regarding the operation performed by each unit of the image capture device 100, information received by the communication control unit 117, and the like. In addition, the memory 102 temporarily records, for example, an image acquired by the image capture unit 112 and an image and information processed by the image processing unit 113, the encoding processing unit 114, and the like. The memory 102 has a storage capacity sufficient for temporarily recording the images and information.

The nonvolatile memory 103 is an electrically erasable and recordable memory. For example, an EEPROM is used as the nonvolatile memory 103. The nonvolatile memory 103 stores a computer program that controls the operation performed by each unit of the image capture device 100 and the information, such as the parameters related to the operation performed by each unit of the image capture device 100. A variety of operations performed by the image capture device 100 are provided by the computer program.

The operation unit 104 provides a user interface used to operate the image capture device 100. The operation unit 104 includes a variety of buttons, such as a power button, a menu button, and a shoot button. Each of the buttons consists of a switch, a touch panel, and the like. The CPU 101 controls the image capture device 100 in accordance with a user instruction input via the operation unit 104. Note that while the case where the CPU 101 controls the image capture device 100 on the basis of an operation input through the operation unit 104 has been described here as an example, the present disclosure is not limited thereto. For example, the CPU 101 may control the image capture device 100 on the basis of a request input from a remote controller (not illustrated), a mobile terminal (not illustrated), or the like via the communication unit 118.

The image capture lens (a lens unit) 111 consists of a lens group (not illustrated) including, for example, a zoom lens and a focus lens, a lens controller (not illustrated), a diaphragm (not illustrated), and the like. The image capture lens 111 can function as zoom means for changing the angle of view. The lens control unit adjusts the focus and controls the aperture value (the F value) on the basis of a control signal transmitted from the CPU 101. The image capture unit 112 can function as acquisition means for sequentially acquiring a plurality of images that form a moving image. As the image capture unit 112, for example, an area image sensor using, for example, a CCD (charge coupled device) or a CMOS (complementary metal oxide semiconductor) device is used. The image capture unit 112 has a pixel array (not illustrated) in which photoelectric conversion units (not illustrated) that convert the optical image of an object into electric signals are arranged in an array, that is, are arranged two-dimensionally. The optical image of an object is formed on the pixel array by the image capture lens 111. The image capture unit 112 outputs the captured image to the image processing unit 113 or the memory 102. Note that the image capture unit 112 can acquire a still image.

The image processing unit 113 performs predetermined image processing on the image data output from the image capture unit 112 or the image data read from the memory 102. Examples of the image processing include interpolation processing, reduction processing (resizing processing), and color conversion processing. Furthermore, the image processing unit 113 performs predetermined arithmetic processing for exposure control, distance measurement control, and the like by using the image data acquired by the image capture unit 112. The CPU 101 performs exposure control, distance measurement control, and the like on the basis of the calculation result obtained through the calculation processing performed by the image processing unit 113. More specifically, the CPU 101 performs an AE (automatic exposure) process, an AWB (auto white balance) process, an AF (auto focus) process, and the like.

The encoding processing unit 114 compresses the size of image data by performing intraframe predictive coding (intra-picture predictive coding), interframe predictive coding (interscreen predictive coding), and the like on the image data. The encoding processing unit 114 is, for example, an encoding device including a semiconductor element or the like. The encoding processing unit 114 may be an encoding device provided outside the image capture device 100. The encoding processing unit 114 performs the encoding process on the basis of, for example, H.265 (ITU H.265 or ISO/IEC23008-2) standard.

The display control unit 115 controls the display unit 116. The display unit 116 includes a display screen (not illustrated). The display control unit 115 performs resizing processing, color conversion processing, and the like on the image data to generate an image that can be displayed on the display screen of the display unit 116 and outputs the image, that is, an image signal, to the display unit 116. The display unit 116 displays an image on the display screen on the basis of the image signal sent from the display control unit 115. The display unit 116 has an OSD (On Screen Display) function, which is a function of displaying a setting screen, such as a menu screen, on the display screen. The display control unit 115 can superimpose an OSD image on the image signal and output the image signal to the display unit 116. The display unit 116 consists of a liquid crystal display, an organic EL display, or the like. The display unit 116 displays the image signal sent from the display control unit 115. The display unit 116 may be, for example, a touch panel. If the display unit 116 is a touch panel, the display unit 116 can also function as the operation unit 104.

The communication control unit 117 is controlled by the CPU 101. The communication control unit 117 generates a modulation signal that conforms to a wireless communication standard predetermined by IEEE 802.11 or the like and outputs the modulation signal to the communication unit 118. In addition, the communication control unit 117 receives a modulated signal that conforms to the wireless communication standard via the communication unit 118, decodes the received modulated signal, and outputs a signal in accordance with the decoded signal to the CPU 101. The communication control unit 117 includes a register for storing communication settings. The communication control unit 117 can adjust the transmission/reception sensitivity during communication under the control of the CPU 101. The communication control unit 117 can perform transmission/reception on the basis of a predetermined modulation technique. The communication unit 118 includes an antenna that outputs the modulated signal supplied from the communication control unit 117 to an external device 127, such as an information communication device, located outside the image capture device 100 and receives a modulated signal from the external device 127. Furthermore, the communication unit 118 includes a communication circuit and the like. Note that while the case in which the communication unit 118 performs wireless communication has been described as an example, the communication performed by the communication unit 118 is not limited to wireless communication. For example, the communication unit 118 and the external device 127 may be electrically connected to each other by a wire or the like.

The recording medium control unit 119 controls the recording medium 120. The recording medium control unit 119 outputs, to the recording medium 120, a control signal for controlling the recording medium 120 on the basis of a request from the CPU 101. As the recording medium 120, a nonvolatile memory or a magnetic disk is used, for example. As described above, the recording medium 120 may be removable or non-removable. The recording medium 120 records coded image data and the like. Image data and the like are stored as a file in a format suitable for the file system of the recording medium 120. Examples of a file include an MP4 file (ISO/IEC 14496-14: 2003), an MXF (Material eXchange Format) file, and the like. The functional blocks 101 to 104, 112 to 115, 117, and 119 are accessible to one another via the internal bus 130.

A normal operation performed by the image capture device 100 according to the present embodiment is described below.

In the image capture device 100, when the user operates a power button of the operation unit 104, the operation unit 104 issues a start instruction to the CPU 101. In response to the instruction, the CPU 101 controls a power supply unit (not illustrated) to supply power to each of the blocks of the image capture device 100. When the power is supplied, the CPU 101 determines in which mode (e.g., a still image capture mode or a playback mode) a mode changeover switch of the operation unit 104 currently is on the basis of an instruction signal from the operation unit 102, for example.

In the normal still image capture mode, the image capture device 100 performs an image capture process when the user operates a still image recording button of the operation unit 104 in an image capture standby state. In the image capture process, the image processing unit 113 performs image processing on the image data of a still image captured by the image capture unit 112, the encoding processing unit 114 performs an encoding process on the image data, and the recording medium control unit 119 records the coded image data onto the recording medium 120 as an image file. Note that in the image capture standby state, the image capture unit 112 captures images at a predetermined frame rate, the image processing unit performs image processing for display, and the display control unit 115 displays the images on the display unit 116 so as to display a live view image.

In the playback mode, the recording medium control unit 119 reads the image file recorded on the recording medium 120, and the encoding processing unit 114 decodes the image data of the read image file. That is, the encoding processing unit 114 further has a decoder function. Thereafter, the image processing unit 113 performs processing for display, and the display control unit 115 instructs the display unit 116 to display the image.

Although normal still image capture and playback are executed as described above, the image capture device according to the present embodiment has an HDR image capture mode for capturing not only normal still images but also HDR still images. In addition, the image capture device can play back a captured HDR still image.

A process for capturing and playing back an HDR still image is described below.

File Structure

A file structure that is used when an HDR still image is recorded is described first.

Recently, a still image file format called High Efficiency Image File Format (hereinafter referred to as "HEIF") has been developed (ISO/IEC 23008-12: 2017).

This file format has the following features, as compared with an existing still image file format, such as a JPEG format:

The file format complies with the ISO base media file format (hereinafter referred to as ISOBMFF) (ISO/IEC 14496-14: 2003).

The file format can store multiple still images as well as a single still image.

The file format can store a still image compressed in a compression format used for compressing a moving image, such as HEVC/H.265 or AVC/H.264.

According to the present embodiment, HEIF is adopted for an HDR still image recording file.

The data stored in HEIF are described first.

HEIF manages individual data to be stored in the units of items.

Each item has, in addition to the data itself, an integer value item ID (item_ID) that is unique in the file and an item type (item_type) that indicates the type of item.

Items fall into two groups: image items having data representing an image and metadata items having data representing metadata.

The image items include a coded image item having data that is coded image data and a derived image item representing an image obtained as a result of operating one or more other image items.

An example of a derived image item is an overlay image which is a derived image item in the overlay format. This is an overlay image obtained as a result of arranging an arbitrary number of image items at arbitrary locations and combining the image items by using an ImageOverlay structure (overlay information). According to the present embodiment, the overlay format is used for the derived image item. However, a grid format may be used. In this case, instead of recording the ImageOverlay structure, the ImageGrid structure (grid information) serving as a derived image item and a plurality of image items are recorded in an HEIF file. The grid format has more constraints than the overlay format, and all image items must be images of the same size. Furthermore, in the grid format, the image item cannot be arranged at arbitrary locations, and an image in which a plurality of images are arranged in a predetermined grid order is played back.

Exif data can be stored as an example of a metadata item.

As mentioned above, the HEIF can store multiple image items.

If there is a relationship among multiple images, the relationship can be set forth.

Examples of the relationship among multiple images include the relationship between the derived image item and the image items that constitute the derived image item and the relationship between a master image and the thumbnail images.

In addition, the relationship between an image item and a metadata item can be set forth in the similar manner.

The HEIF format complies with the ISOBMFF format. For this reason, ISOBMFF is briefly described first.

According to the ISOBMFF format, data is managed in a structure called a box.

The box is a data structure that begins with a 4-byte data length field and a 4-byte data type field followed by data having an arbitrary length.

The structure of a data portion is determined by the data type. The ISOBMFF specifications and the HEIF specifications define several data types and the structure of the data portion for each of the data types.

In addition, a box may have another box as the data. That is, the boxes can be nested. In this case, a box nested in the data portion of a certain box is referred to as a "sub box".

A box that is not a sub box is referred to as a "file level box", which is a box that can be accessed sequentially from the beginning of the file.

A file in the HEIF format is described below with reference to FIG. 2.

The file level box is described first.

The file type box having a data type of 'ftyp' stores information about the compatibility of the file. The ISOBMFF-compliant file specification declares a file structure defined by the specification and data stored in the file by using a 4-byte code called a brand and stores the brand in the file type box. By placing the file type box at the beginning of the file, a file reader can recognize the structure of the file by checking the contents of the file type box without further reading and interpreting the contents of the file.

According to the HEIF specification, the file structure is expressed by the brand 'mif1'. In addition, if the coded image data to be stored is HEVC-compressed data, the file structure is expressed by the brand "heic" or "heix" in accordance with the HEVC compression profile.

A metadata box having a data type of 'meta' stores a variety of sub boxes and stores data relating to each item. The data are described in detail below.

A media data box having a data type of 'mdat' stores the data of each item. The data is, for example, the coded image data of a coded image item, Exif data of a metadata item, or the like.

The sub box of a metadata box is described below.

A handler box having a data type of 'hdlr' stores information indicating the type of data managed by the metadata box. According to the HEIF specification, handler_type of the handler box is 'pict'.

A data information box having a data type of 'dinf' specifies a file in which the target data of this file is present. In ISOBMFF, the target data of a given file can be stored in a file other than that file. In this case, a data entry URL box denoting the URL of a file having the data therein is stored in a data reference in the data information box. If the target data is present in the same file, a data entry URL box having only a flag indicating that information is stored.

A primary item box having a data type of 'pitm' stores the item ID of an image item representing the master image.

An item information box having a data type of 'iinf' is a box for storing the item information entries described below.

The item information entry having a data type of 'infe' stores the item ID, item type, and flag of each item.

The item type of an image item that is data obtained by HEVC-compressing coded image data is 'hvc1', which is an image item.

The item type of a derived image item in the overlay format, that is, the ImageOverlay structure (overlay information) is 'iovl', which is classified as an image item.

The item type of the metadata item in the Exif format is 'Exif', which is a metadata item.

In addition, if the least significant bit of the flag field of an image item is set, the image item can be specified as a hidden image. If the flag is set, the image item is not treated as an item to be displayed during playback and, thus, the image item is hidden.

An item reference box having a data type of 'iref' stores a reference relationship among items in the form of the type of reference relationship, the item ID of the referencing item, and the item IDs of one or more referenced items.

In the case of a derived image item having the overlay format, a reference relationship type is set to 'dimg', the item ID of the referencing item is set to the item ID of the derived image item, and the item ID of the referenced item is set to the item ID of each of the image items that constitute the overlay.

In the case of a thumbnail image, the type of reference relationship is set to 'thmb', the item ID of the referencing item is set to the item ID of the thumbnail image, and the item ID of the referenced item is set to the item ID of the master image.

The item property box having a data type of 'iprp' is a box for storing an item property container box and an item property association box (both are described below).

The item property container box having a data type of 'ipco' is a box for storing boxes of individual property data.

Each of the image items can have property data indicating the characteristics and attributes of the image.

Property data boxes include the following.

Decoder configuration and initialization data (Decoder configuration and initialization; in the case of HEVC, the type is 'hvcC') is data used for initialization of a decoder. HEVC parameter set data (VideoParameterSet, SequenceParameterSet, and PictureParameterSet) is stored in the data.

The image spatial extents (the type is 'ispe') are image sizes (width, height).

Color space information (Color information; the type is 'colr') is color space information of the image.

Image rotation information (Image rotation; the type is 'irot') is the direction of rotation when the image is rotated and displayed.

Pixel information about an image (the type is 'pixi') is information indicating the number of bits of data that constitutes the image.

In addition, according to the present embodiment, as HDR metadata, master display color volume information (Mastering display color volume; the type is 'MDCV') and content light level information (Contents light level information; the type is 'CLLI') are stored in the form of a property data box.

Although properties other than the above-described properties exist, they are not described here.

An item property association box having a data type of 'ipma' stores association between each of the items and the property in the form of an item ID and an array of indices in 'ipco' of the associated property.

An item data box having a data type of 'idat' is a box for storing item data having a small data size.

Regarding the data of a derived image item in the overlay format, the ImageOverlay structure (overlay information) that stores the location information of the constituent images and the like can be stored in 'idat'. Examples of overlay information include a canvas_fill_value parameter that is background color information, an output_width and output_height parameters that specify the size of a playback image after final composition by overlay. Furthermore, examples of overlay information include, for each image that is an element of the composite image, horizontal_offset and vertical_offset parameters that indicate the horizontal location coordinate and the vertical location coordinate of the arrangement location in the composite image, respectively. By using these parameters included in the overlay information, a composite image can be played back in which multiple images are arranged at given locations within a single image having a specified background color and size.

An item location box having a data type of 'iloc' stores the location information of the data of each item in the form of an offset reference (construction_method), an offset value from the offset reference, and a length. The offset reference is the beginning of the file or 'idat'.

Although there are boxes other than the above-described boxes in the metadata box, they are not described here.

FIG. 2 illustrates a structure in which two coded image items constitute an overlay format image. The number of coded image items that constitute an overlay format image is not limited to two. As the number of coded image items that constitute an overlay format image increases, the numbers of the boxes and items increase as follows:

The item information entry of the coded image item is added to the item information box.

The number of the item IDs of the coded image items increases in the reference item IDs having the reference relation type 'dimg' of the item reference box.

Decoder configuration/initialization data, image space range, etc. are added to the item property container box.

An item of the indices of a coded image item and the associated property are added to the item property association box.

An item of location information of coded image item is added to the item location box.

Coded image data is added to the media data box.

Capture of HDR Image

The process performed by the image capture device 100 to capture and record an HDR image is described below.

Recently, the width and height of an image to be recorded have been increasing. If an image having a too large size is encoded, the compatibility may be lost when the image is decoded with another device or the scale of the system may increase. More specifically, according to the present embodiment, an example in which the H.265 code is used for encoding/decoding is described. The H.265 standard has parameters such as Profile and Level, and these parameters change if the image coding method changes or the image size increases. These values are parameters for a device that decodes the image to determine whether to play back the image. In some cases, the device that checks the parameters determines that the image cannot be played back. The present embodiment describes a method for, when an image having a large image size is record, dividing the image into a plurality of image display areas and storing the coded data of the image display areas in an HEIF file by using the overlay technique defined by the HEIF standard. By dividing the image into a plurality of image display areas in this manner, the size of each of the image display areas is reduced and, thus, the playback compatibility with other devices is improved. In the description below, the size of one side of a coding area is set to 4096 or less. Note that the coding format may be other than H.265. In addition, the size of one side may be set to a size other than 4096.

Hereinafter, a description is given of alignment constraints on the start location of the coding area, the width/height of the coding area, the start location of the playback area, and the width/height of the playback area. In general, when encoding divided images, an image capture device has a hardware constraint on vertical/horizontal encoding start alignment of the coding area, playback width/height alignment during playback, and the like. That is, the image capture device needs to calculate the coding start location of each of one or more coding areas, the start location of the playback area, and the width/height of the playback area and encode the coding area. Because the image capture device switches between a plurality of image sizes in accordance with an instruction from the user and records the coding areas, the image capture device needs to switch these values for each of the image sizes.

At the time of encoding, the encoding processing unit 114 described in the present embodiment has an alignment constraint that the start location is given in the unit of 64 pixels in the horizontal direction (hereinafter referred to as the "x direction") and in the unit of 1 pixel in the vertical direction (hereinafter referred to as the "y direction"). In addition, the encoding processing unit 114 has an alignment constraint that the encoded width and height are given in the unit of 32 pixels and in the unit of 16 pixels, respectively. The alignment constraint on the start location of a playback area is that the start location is given in units of 2 pixels in the x direction and in units of 1 pixel in the y direction. In addition, the width-height alignment constraint of the playback area is that the width and height are given in the unit of 2 pixels and in the unit of 1 pixel, respectively. While the examples of the alignment constraint have been described here, another alignment constraint may be employed, in general.

A flow is described below with reference to FIG. 3, which starts when HDR image data is captured and ends when the captured HDR image data is recorded as an HEIF file in the HDR recording mode (the HDR image capture mode). In the HDR mode, the image capture unit 112 and the image processing unit 113 perform a process to express the HDR color space by using the color gamut BT.2020 and the PQ gamma curve. According to the present embodiment, description of recording for HDR is not given.

In S101, the CPU 101 determines whether the user has pressed an SW2. If the user captures the image of an object and presses down to the SW2 (YES in S101), the CPU 101 detects that the SW2 is pressed, and the processing proceeds to S102. The CPU 101 continues the detection until the SW2 is pressed (NO in S101).

Figure 4:
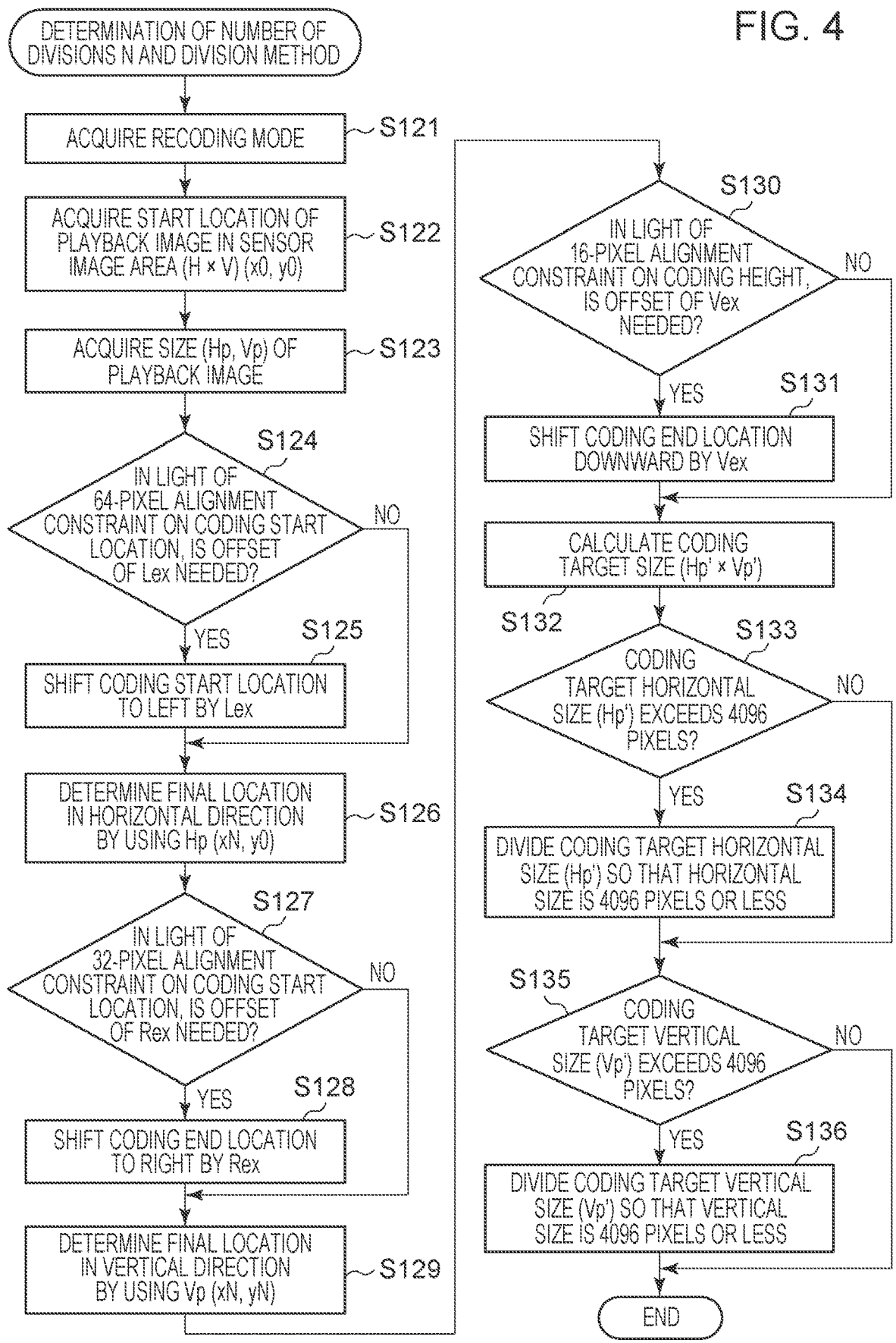
FIG. 4 is a flowchart illustrating a process for determining a method for dividing image data in an HDR image capture mode.

In S102, to store, in an HEIF file, an image captured on the basis of the angle of view determined by the user, the CPU 101 determines into how many areas the coding area is divided in each of the vertical direction and horizontal direction (the number of divisions N) and determines how to divide the coding area. The result of determination is stored in the memory 102. The process in S102 is described below with reference to FIG. 4. The processing proceeds to S103.

In S103, the CPU 101 initializes a variable M in the memory 102 so that M=1. Thereafter, the processing proceeds to S104.

In S104, the CPU 101 monitors whether the process iterates N times (the number of divisions N determined in S102). If the number of iterations reaches the number of divisions N (YES in S104), the processing proceeds to S109. Otherwise (NO in S104), the processing proceeds to S105.

In S105, the CPU 101 reads out the information regarding the code start area and the playback area of the divided image M from the above-described memory 102. The processing proceeds to S106.

In S106, the CPU 101 informs the encoding processing unit 114 of which area of the entire image disposed in the memory 102 is to be encoded and causes the encoding processing unit 114 to encode the area. The processing proceeds to S107.

In S107, the CPU 101 temporarily stores, in the memory 102, the code data resulting from the coding performed by the coding processing unit 114 and the associated information generated at the time of coding. More specifically, in the case of H.265, the information is H.265 standard information, such as VPS, SPS, and PPS, which need be stored later in the HEIF file. Since the information is not directly related to the present embodiment, description of the information is not given here. The VPS, SPS, and PPS of H.265 are various types of information necessary for decode processing, such as the code data size, bit depth, designation of a display/non-display area, and frame information. Thereafter, the processing proceeds to S108.

In S108, the CPU 101 increments the variable M by one. The processing returns to S104.

In S109, the CPU 101 generates metadata to be stored in the HEIF file. The CPU 101 extracts information necessary for playback from, for example, the image capture unit 112, the image processing unit 113, and the encoding processing unit 114 and temporarily stores the extracted information in the memory 102 as metadata. More specifically, the information is data converted into the Exif format. Since the details of Exif data are widely known, description of the Exif data is not given in the present embodiment. The processing proceeds to S110.

In S110, the CPU 101 encodes the thumbnail. The image processing unit 113 reduces the entire image stored in the memory 102 into a thumbnail size and temporarily places the image in the memory 102. The CPU 101 instructs the encoding processing unit 114 to encode the thumbnail image placed in the memory 102. At this time, the thumbnail is encoded with a size that satisfies the alignment constraint described above. However, different methods may be employed for the coding area and the playback area. The thumbnail is also encoded by H.265. The processing proceeds to S111.

In S111, the CPU 101 temporarily stores, in the memory 102, code data obtained as a result of encoding the thumbnail by the encoding processing unit 114 and associated information generated at the time of encoding. As in the above description of S107, the associated information is the H.265 standard information, such as VPS, SPS, and PPS. Thereafter, the processing proceeds to S112.

In S112, the CPU 101 combines the various data stored in the memory 102 to build an HEIF file and stores the HEIF file in the memory 102. The flow for building the HEIF file is described below with reference to FIG. 6. The processing proceeds to S113.

In S113, the CPU 101 instructs the recording medium control unit 119 to write the HEIF file stored in the memory 102 to the recording medium 120. Thereafter, the processing returns to S101.

Through the above-described steps, the image capture operation is performed and, thereafter, the HEIF file is recorded on the recording medium 120.

Figure 5A:
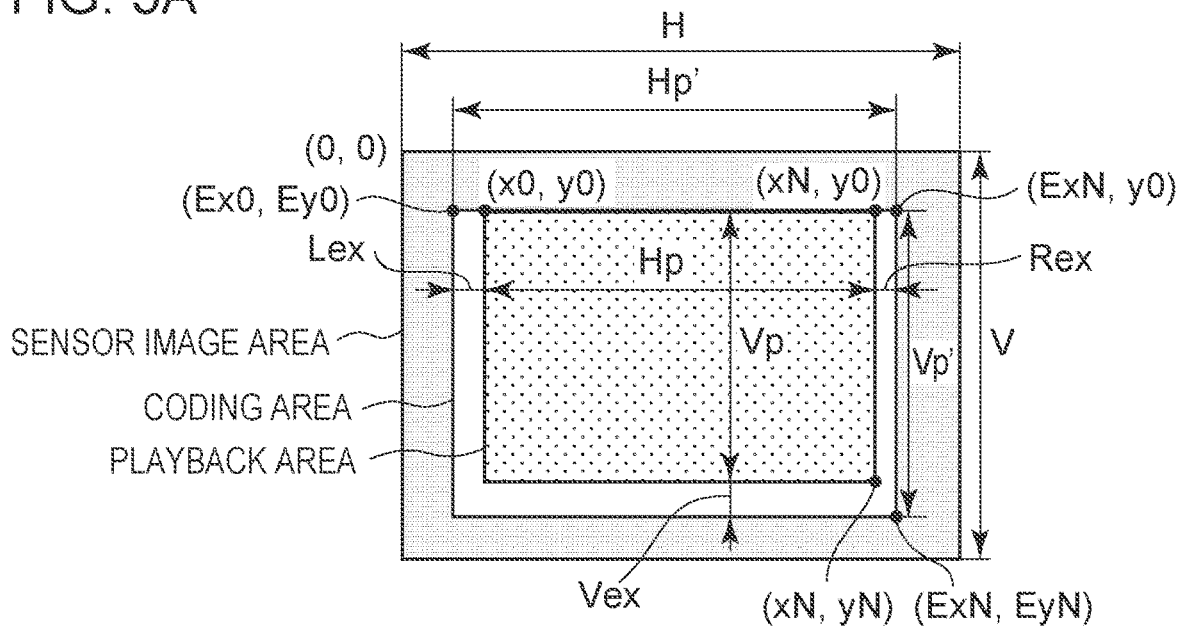
FIG. 5A is a diagram illustrating a coding area of image data and a division method at the time of recording of HDR image data.

The determination of the division method in S102 described above is described below with reference to FIGS. 4 and 5A. Hereinafter, the upper left corner of the sensor image area is defined as the origin (0, 0). The coordinates are expressed as (x, y), and the width and height are denoted as w and h, respectively. In addition, an area is denoted as [x, y, w, h], where (x, y) represents the start coordinates of the area, and w and h represent the width and the height of the area, respectively.

In S121, the CPU 101 acquires, from the memory 102, the recording mode used at the time of image capture. The recording mode represents a recording method determined by, for example, the image size, the image aspect ratio, and the image compression ratio. The user selects one of the recording modes and captures an image. For example, a recording method represents the settings, such as L size and 3:2 aspect. Since the angle of view during image capture varies in accordance with the recording mode, the CPU 101 determines the angle of view during image capture. The processing proceeds to S122.

In S122, the CPU 101 acquires the start coordinate location (x0, y0) of the playback image in the sensor image area [0, 0, H, V]. Thereafter, the processing proceeds to S123.

In S123, the size [Hp, Vp] of the playback image is acquired from the memory 102. Thereafter, the processing proceeds to S124.

In S124, the CPU 101 needs to perform encoding such that the coding area includes the start coordinate location of the area of the playback image. As described above, the alignment of the code start location is 64-pixel based alignment in the x direction. For this reason, if encoding is performed such that the coding area includes the start coordinate location of the area of the playback image, the encoding needs to be performed from the location (Ex0, Ey0). In this way, the Lex size is obtained. If the Lex offset is 0 (NO in S124), the processing proceeds to S126. However, if the offset is necessary (YES in S124), the processing proceeds to S125.

In S125, Lex is calculated. As described above, Lex is determined by the alignment between the playback image area and the coding start location. The CPU 101 determines Lex as follows. That is, x0 is divided by 64 pixels which the pixel alignment of the horizontal encoding start location, and the quotient is multiplied by the above-described 64 pixels to obtain the value of Lex. Since the calculation is performed without including the remainder, the coordinates located on the left side of the start location of the playback image area are obtained. Therefore, Lex is obtained as the difference between the x coordinate of the playback image area and the x coordinate of the encoding start location obtained by the above-described calculation. The processing proceeds to S126.

In S126, the coordinates of the final location of the right end of the top line of the playback image are calculated. Let (xN, y0) be the coordinates of the final location. Then, xN is obtained by adding Hp to x0. The processing proceeds to S127.

In S127, the right end of the coding area is obtained such that the coding area includes the right end of the playback image. To obtain the right end w of the coding area, the alignment constraint on the coding width is needed. As described above, there are constraints on the encoding width and height, each of which should be a multiple of 32 pixels. From the relationship between this constraint and (xN, y0), the CPU 101 calculates whether the Rex offset is required on the right side of the right end of the playback image. If Rex offset is required (YES in S127), the processing proceeds to S128. However, if Rex offset is not required (NO in S127), the processing proceeds to S129.

In S128, the CPU 101 adds Rex on the right side of the right end coordinates (xN, y0) of the playback image so as to satisfy an alignment of 32 pixels and obtains the encoding end location (ExN, Ey0). The processing proceeds to S129.

In S129, the CPU 101 obtains the lower right coordinates of the display area. Since the size of the playback image is already known, the coordinates are (xN, yN). The processing proceeds to S130.

In S130, the CPU 101 obtains the lower end of the coding area such that the coding area includes the lower end of the playback image. To obtain the lower end of the coding area, the alignment constraint on the coding height is needed. As described above, there is an alignment constraint on the encoding heights, which is a multiple of 16 pixels. From the relationship between this constraint and the lower right coordinates (xN, yN) of the playback image, the CPU 101 calculates whether a Vex offset is required under the lower end of the playback image. If Vex is required (YES in S130), the processing proceeds to S131. However, if Vex is not required (NO in S130), the processing proceeds to S132.

In S131, from the relationship between the above-described constraint and the lower right coordinates (xN, yN) of the playback image, the CPU 101 calculates Vex and obtains the lower right coordinates (ExN, EyN) of the coding area. In calculating Vex, Vex is set at a location that is a multiple of 16 pixels from y0 which is the coding start location in the vertical direction so that the coding area includes yN. More specifically, assuming that y0=0, Vp is divided by 16 pixels (the coding height alignment) to obtain the quotient and the remainder. The coding area must be determined so as to include the playback area. Accordingly, if there is a remainder, the quotient is incremented by 1 and, thereafter, is multiplied by the above-described 16 pixels. In this manner, EyN which is a multiple of 16 pixels is obtained as the y coordinate of the lower end of the coding area so that the coding area includes Vp. Vex is obtained as the difference between EyN and yN. Note that EyN is a value offset downward from yN by Vex, and ExN is a value already obtained in S128. The processing proceeds to S132.

In S132, the CPU 101 obtains the size Hp'×Vp' of the coding area as follows. That is, Lex and Rex obtained on the basis of the alignment constraints are added to the horizontal size Hp to obtain Hp'. In addition, Vex obtained on the basis of the alignment constraint is added to the vertical size Vp to obtain Vp'. From Hp' and Vp', the size Hp'×Vp' of the coding area can be obtained. The processing proceeds to S133.

In S133, the CPU 101 determines whether the horizontal size Hp' to be encoded exceeds 4096 pixels to be divided. If the horizontal size Hp' exceeds 4096 pixels (YES in S133), the processing proceeds to S134. However, if the horizontal size Hp' does not exceed 4096 pixels (NO in S133), the processing proceeds to S135.

In S134, the CPU 101 divides the horizontal size Hp' to be encoded into two or more areas so that the horizontal size Hp' is 4096 pixels or less. For example, if the horizontal size Hp' is 6000 pixels, the horizontal size Hp' is divided into two. If the horizontal size Hp' is 9000 pixels, the horizontal size Hp' is divided into three.

In the case of division into two areas, division is performed at an approximate center location that satisfies the 32-pixel alignment regarding the encoding width. If the horizontal size is not divided evenly, division is performed such that the left divided image has a larger size. In addition, in the case of division into three areas, if the horizontal size is not divided evenly, the horizontal size is divided into divided areas A, B, and C such that the divided areas A and B have the same size while the divided area C has a slightly smaller size than the divided area A or B. At this time, the above-described alignment regarding the coding width is taken into account. Even in the case of division into three or more areas, the location at which the division is performed and the size are determined by the same algorithm. The processing proceeds to S135.

In S135, the CPU 101 determines whether the vertical size Vp' to be encoded exceeds 4096 pixels to be divided. If the vertical size Vp' exceeds 4096 pixels (YES in S135), the processing proceeds to S136. However, if the vertical size Vp' does not exceed 4096 pixels (NO in S135), the processing ends.

In S136, as in S134, Vp' is divided into a plurality of divided areas, and the processing ends.

An example of division in S102 is described by specific numerical values in FIGS. 5B, 5C, 5D, and 5E. FIG. 5 illustrates the method for dividing the image data as well as the relationship between the coding area and the playback area.

Figure 5B:
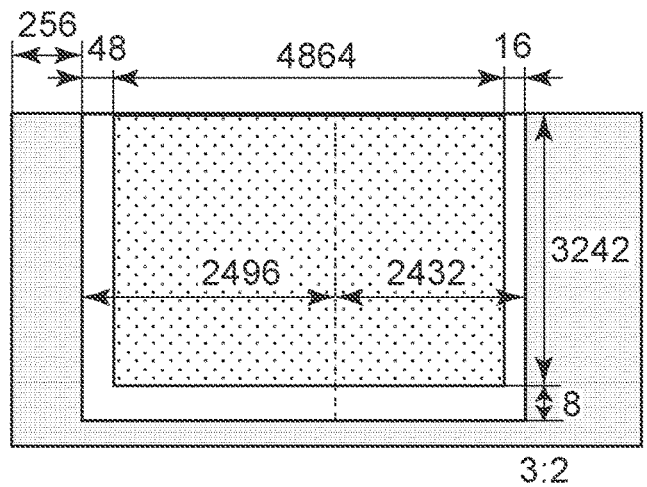
FIG. 5B is a diagram illustrating a coding area of image data and a division method at the time of recording of HDR image data.

FIG. 5B is described below. FIG. 5B illustrates the case in which the image is divided into two areas, that is, left and right areas, and Lex, Rex, and Vex are added to the left, right, and the lower ends of the playback area, respectively. First, in terms of the playback image area, the area [256+48, 0, 4864, 3242] is an area of a final image to be recorded by the image capture device. The upper left coordinates of the playback image area are (256+48, 0), which are not a multiple of 64 pixels (the above-described start alignment of the encoding). Therefore, a Lex of 48 pixels is provided to the left of the coordinates, and the encoding start location is the location of x=256. Subsequently, in terms of the width of the playback area, w=48+4864, which is not a multiple of 32 pixels (the alignment for the encoding width). Therefore, to satisfy the alignment constraint regarding the width at the time of encoding, a Rex of 16 pixels is provided to the right end of the playback image area. When similar calculation is made for the vertical direction, Vex=4 pixels. Since the size of this playback image exceeds 4096 in the horizontal direction, the size in the horizontal direction is divided into two at an approximate center location, in consideration of alignment of the encoding width. As a result, the coding area of [256, 0, 2496, 3242+8] is obtained for divided image 1, and the coded area of [256+2496, 0, 2432, 3242+8] is obtained for divided image 2.

Figure 5C:
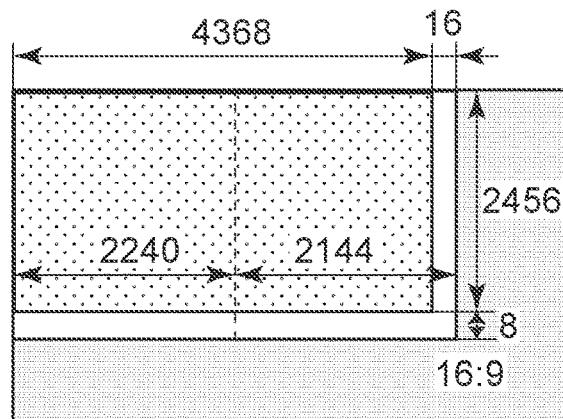
FIG. 5C is a diagram illustrating a coding area of image data and a division method at the time of recording of HDR image data.

FIG. 5C is described. FIG. 5C illustrates the case in which the image is divided into two areas, that is, left and right areas, and Rex and Vex are provided on the right and lower ends of the playback area, respectively. The x location of the playback image area is defined as x=0. Accordingly, Lex=0 because the x location matches the 64-pixel start alignment of the coding area. In the same manner as described above, calculation is made. As a result, a coding area of [0, 0, 2240, 32456+8] is obtained for divided image 1, and the coded image area of [2240, 0, 2144, 2456+8] is obtained for divided image 2.

Figure 5D:
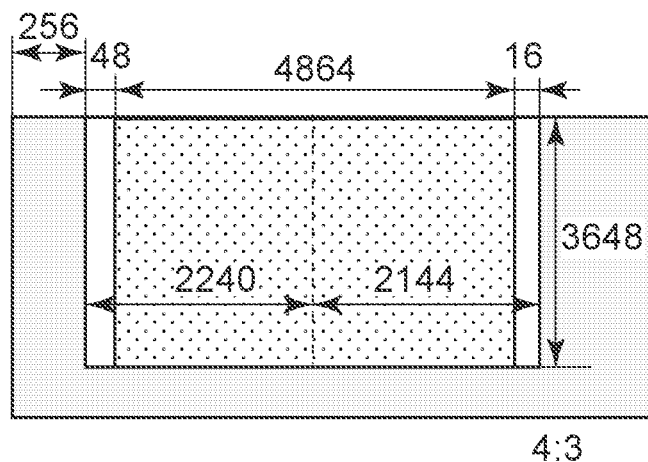
FIG. 5D is a diagram illustrating a coding area of image data and a division method at the time of recording of HDR image data.

FIG. 5D is described. FIG. 5D illustrates the case in which the image is divided into two areas, that is, left and right areas. Lex and Rex are provided on the left and right ends of the playback area, respectively. The vertical size h of the playback image area is 3648, which is a multiple of 16 pixels (a constraint on the image height at the time of encoding) and, thus, Vex=0. Calculation is performed in the same manner as described above. As a result, a coding area of [256+48, 0, 2240, 3648] is obtained for divided image 1, and the coded image area of [256+2240, 0, 2144, 3648] is obtained for divided image 2.

Figure 5E:
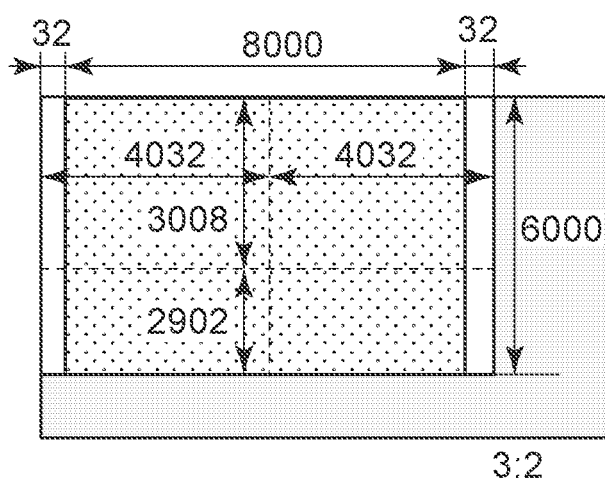
FIG. 5E is a diagram illustrating a coding area of image data and a division method at the time of recording of HDR image data.

FIG. 5E is described. FIG. 5E illustrates the case in which an image is divided into four areas (2-by-2 areas), and Lex and Rex are provided on the left and right ends of the playback area, respectively. In this case, since the coding area exceeds 4096 in each of the vertical direction and the horizontal direction, division is performed to form 2-by-2 areas. Calculation is made in the same manner as described above. As a result, a coding area of [0, 0, 4032, 3008] is obtained for divided image 1, a coded image area of [4032, 0, 4032, 3008] is obtained for divided image 2, a coded image area of [0, 3008, 4032, 2902] is obtained for divided image 3, and a coded area of [4032, 3008, 4032, 2902] is obtained for divided image 4.

In this way, the CPU 101 needs to determine the areas of the playback image in accordance with the recording mode and calculate the divided area for each of the areas. As another method, these calculations may be performed in advance, and the results may be stored in the memory 102. The CPU 101 may read, from the memory 102, the information regarding the divided areas and the playback area in accordance with the recording mode and set settings of the encoding processing unit 114.

When the captured image is divided into a plurality of divided images and is recorded as in the present embodiment, a plurality of display areas need to be combined to restore the captured image from the recorded images. When the composite image is generated, it is more efficient if there is no overlapping area between the divided images, because extra data encoding process and recording process are not needed. For this reason, according to the present embodiment, each of the playback areas and each of the coding areas are determined so that there is no overlapping portion (no overlapping area) at the boundary between the divided images. However, an overlapping area may be provided between divided images in accordance with conditions such as hardware alignment constraints.

A method for constructing an HEIF file mentioned in S112 is described below with reference to FIG. 6. Since an HEIF file has the structure illustrated in FIG. 2, the CPU 101 constructs the file in the memory 102 sequentially from the beginning of the file.

In step S141, an 'ftyp' box is generated. This box is a box used to get to know the compatibility of a file and is placed at the beginning of the file. The CPU 101 stores 'heic' in the major brand of the box and stores 'mif1' and 'heic' in the compatible brand. According to the present embodiment, these values are used. However, other values may be used. The processing proceeds to S142.

In step S142, the 'meta' box is generated. This box is a box used to store a plurality of boxes described below. The CPU 101 generates the box, and the processing proceeds to S143.

In S143, the 'hdlr' box to be stored in the 'iinf' box is generated. This box describes the attributes of the 'meta' box described above. The CPU 101 stores 'pict' in this box, and the processing proceeds to S144. Note that 'pict' is information indicating the type of data managed by the metadata box. According to the HEIF specification, the handler_type of the handler box is defined as 'pict'.

In S144, the 'dinf' box to be stored in the 'iinf' box is generated. This box indicates the location of the data targeted by this file. The CPU 101 generates this box, and the processing proceeds to S145.

In S145, the 'pitm' box to be stored in the 'iinf' box is generated. This box stores the item ID of the image item that represents the master image. Since the master image is an overlay image combined by overlay, the CPU 101 stores the overlay information item ID as the item ID of the master image. The processing proceeds to S146.

In S146, the 'iinf' box to be stored in the 'meta' box is generated. This box is a box used to manage a list of items. Here, an initial value is set in the data length field, and 'iinf' is stored in the data type field. Thereafter, the processing proceeds to S147.

In S147, the 'infe' box to be stored in the 'iinf' box is generated. The 'infe' box is a box used to register item information about each of the items stored in the file. An 'infe' box is generated for each of the items. In terms of the divided images, each of the divided images is registered in this box as one item. In addition, the overlay information used to construct a master image from a plurality of divided images, Exif information, and thumbnail images are registered as individual items. At this time, as described above, the overlay information, the divided images, and the thumbnail image are registered as image items. A flag indicating a hidden image can be added to the image item. By adding the flag, the image is not displayed during playback. That is, by adding the hidden image flag to the image item, an image to be hidden during playback can be specified. Thus, a flag indicating a hidden image is set for the divided image, while the flag is not set for the overlay information item. In this manner, the individual divided images are excluded from the images to be displayed, and only the image resulting from overlay composition of the plurality of divided images based on the overlay information becomes the image to be displayed. The 'infe' box is generated for each of the items and is stored in the above-described 'iinf'. The processing proceeds to S148.

In S148, the 'iref' box to be stored in the 'iinf' box is generated. This box stores information indicating the relationship between an image constructed through overlay (a master image) and divided images that constitute the image. Since the division method has been determined in S102 described above, the CPU 101 generates this box on the basis of the determined division method. The processing proceeds to S149.

In S149, the 'iprp' box to be stored in the 'iinf' box is generated. This box is a box used to store the property of the item and is a box used to store the 'ipco' box generated in S150 and the 'ipma' box generated in S151. The processing proceeds to S150.

In S150, the 'ipco' box to be stored in the 'iprp' box is generated. This box is a property container box for an item and stores a variety of properties. A plurality of properties are present, and the CPU 101 generates a property container box described below and stores the generated box in the 'ipco' box. The properties fall into two groups: a property generated for each image item and a property commonly generated for a plurality of image items. A 'colr' box is generated as information common to the overlay image composed of the overlay information that serves as a master image and the divided images. The 'colr' box stores color information, such as an HDR gamma curve, as color space information regarding the master image (the overlay image) and divided images. For each of the divided images, the 'hvcC' box and the 'ispe' box are generated. In S107 and S111 described above, the CPU 101 reads the associated information generated at the time of encoding and stored in the memory 102 and generates the property container box of 'hvcC'. The associated information stored in 'hvcC' include not only the information used when the coding area is encoded and the size (the width and height) of the coding area but also the size (the width and height) of the playback area and the location information of the playback area in the coding area and the like. The associated information is Golomb-compressed and recorded in the property container box of 'hvcC'. Since Golomb compression is a well-known compression method, description of Golomb compression is not given here. In addition, the size (the width and height) information (for example, 2240×2450) of the playback area of the divided image is stored in the 'ispe' box. An 'irot' box that stores information indicating the rotation of the overlay image serving as the master image and a 'pixi' box indicating the number of bits of image data are generated. The 'pixi' box may be generated separately for the master image (the overlay image) and the divided image. However, according to the present embodiment, since the overlay image and the divided image have the same number of bits, that is, 10 bits, only one 'pixi' box is generated. In addition, the 'CLLI' and the 'MDCV' box for storing HDR complementary information are generated. Furthermore, as the properties of the thumbnail image, the following boxes are generated separately from the master image (the overlay image): a 'colr' box that stores color space information, an 'hvcC' box that stores information used at the time of encoding, and an 'ispe' box that stores the image size, a 'pixi' box that stores information regarding the number of bits of image data, and a 'CLLI' box that stores HDR complementary information. These property container boxes are generated and stored in the 'ipco' box. The processing proceeds to S151.

In step S151, the 'ipma' box is generated. This box is a box describing the relationship between an item and the property and indicates which of the above-described properties is related to each of the items. The CPU 101 determines the relationship between the item and the property from the variety of data stored in the memory 102 and generates this box. The processing proceeds to S152.

In step S152, the 'idat' box is generated. This box stores overlay information indicating how to arrange the playback areas of the divided images to generate the overlay image. The overlay information includes a canvas_fill_value parameter, which is background color information, and an output_width parameter and an output_height parameter, which indicate the size of the entire overlay image. The overlay information further includes, for each of the divided images that are composition elements, a horizontal_offset parameter and a vertical_offset parameter that indicate the horizontal location coordinates and the vertical location coordinates used to combine the divided images, respectively. The CPU 101 writes these pieces of information to the parameters on the basis of the division method determined in S102. More specifically, the CPU 101 writes the size of the entire playback area to the output_width parameter and output_height parameter that indicate the size of the overlay image. Thereafter, the CPU 101 writes, to the horizontal_offset parameter and the vertical_offset parameter that indicate the location information of each of the divided images, offset values in the width direction and the height direction measured from the start coordinate location (x0, y0) of the upper left corner of the playback area to the upper left locations of the divided image, respectively. By generating the overlay information in this manner and arranging and combining the divided images on the basis of the horizontal_offset and vertical_offset parameters at the time of playing back the image, the image before being divided can be played back. According to the present embodiment, the divided images do not have an overlapping area. Accordingly, the location information is set forth so that the divided images are arranged so as not to overlap each other. Then, by specifying an area of the image obtained by combining the divided images that is to be displayed on the basis of the output_width and output_height parameters, only the playback area can be played back (displayed). The CPU 101 generates the 'idat' box storing the overlay information generated in this manner. The processing proceeds to S153.

In step S153, the 'iloc' box is generated. This box is a box indicating the location in the file at which each of the variety of data is disposed. Since various pieces of information is stored in the memory 102, this box is generated on the basis of the sizes of the information. More specifically, the information indicating the overlay is stored in the above-mentioned 'idat', and the information stored in the 'iloc' box is the location inside the 'idat' and the size information. Furthermore, the thumbnail data and the code data 12 are stored in the 'mdat' box, and the information stored in the 'iloc' box is the location and size information. The processing proceeds to S154.

In step S154, the 'mdat' box is generated. This box is a box including a plurality of boxes described below. The CPU 101 generates the 'mdat' box, and the processing proceeds to S155.

In step S155, the Exif data is stored in the 'mdat' box. Since the Exif metadata is stored in the memory 102 in S109 described above, the CPU 101 reads the Exif from the memory 102 and appends the Exif to the 'mdat' box. The processing proceeds to S156.

In S156, the thumbnail data is stored in the 'mdat' box. Since the thumbnail data is stored in the memory 102 in S110 described above, the CPU 101 reads the thumbnail data from the memory 102 and appends the thumbnail data to the 'mdat' box. The processing proceeds to S157.

In S157, the data of the coded image 1 is stored in the 'mdat' box. Since the data of the divided image 1 is stored in the memory 102 in the above-described S106 of the first iteration, the CPU 101 reads the data from the memory 102 and appends the data to the 'mdat' box. This operation is repeated up to the coded image N so that all coded images 1 to N are appended to the 'mdat' box. Through these steps, the CPU 101 constructs an HEIF file.

Through the above-described processing, the HDR image can be recorded on the recording medium 120 in the HEIF format illustrated in FIG. 2. As described above, when capturing an HDR image, the image capture device 100 according to the present embodiment divides the captured HDR image into a plurality of divided HDR images, compression-encodes the images by HEVC, and records the images in the HEIF format. In contrast, when capturing an SDR image, the image capture device 100 JPEG-compression encodes the SDR image without dividing the SDR image and records the SDR image in the form of a JPEG file.

Playback of HDR image

Processing performed by the image capture device 100 that plays back an HDR image file recorded on the recording medium 120 in the HEIF format is described below. Note that the present embodiment is described with reference to the case in which the image capture device 100 plays back an HDR image. However, the same processing may be performed by an image processing apparatus having no image capture unit when the image processing apparatus plays back an HDR image recorded on the recording medium 120 in the HEIF format.

HEIF playback (display) processing performed when the master image is an overlay image is described with reference to FIG. 7.

In step S701, the CPU 101 uses the recording medium control unit 119 to read the head portion of the specified file existing in the recording medium 120 into the memory 102. Thereafter, the CPU 101 checks whether a file type box having a proper structure exists in the head portion of the read file and further checks whether 'mif1' indicating HEIF exists in the brand in the file type box.

Alternatively, if a brand corresponding to the unique file structure has been recorded, the CPU 101 checks the existence of the brand. As long as the brand guarantees a specific structure, some subsequent steps for checking the structures (for example, steps S703 and S704) can be eliminated by checking the brand.

In step S702, the CPU 101 reads the metadata box of the specified file from the recording medium 120 into the memory 102.

In step S703, the CPU 101 searches the metadata box read in step S702 for a handler box and checks the structure. In the case of HEIF, the handler type must be 'pict'.

In step S704, the CPU 101 searches the metadata box read in step S702 for the data information box and checks the structure. According to the present embodiment, since it is assumed that the data exists in the same file, the CPU 101 checks whether a flag indicating that information is set in the data entry URL box.

In step S705, the CPU 101 searches the metadata box read in step S702 for the primary item box and acquires the item ID of the master image.

In step S706, the CPU 101 searches the metadata box read in step S702 for the item information box and acquires the item information entry corresponding to the item ID of the master image acquired in step S705. In the case of the HEIF format image file recorded through the above-described HDR image capture process, the overlay information is specified as the master image. That is, in the item information entry corresponding to the item ID of the master image, the item type is "iovl", which indicates overlay.

In step S707, the CPU 101 performs an overlay image generation process. The overlay image generation process is described below with reference to FIG. 8.

In step S708, the CPU 101 displays the overlay image generated in step S707 on the display unit 116 via the display control unit 115.

Note that when displaying the generated overlay image, the color space information of the image may need to be specified. Since in the color space information of the image, the color gamut is specified by color_primaries of the color space property 'colr' and the transfer characteristic (corresponding to gamma) is specified by transfer_characteristics, these values are used. As an example of an HDR image, Rec. ITU-R BT.2020 is used for the color gamut, and ITU-R BT.2100 (PQ) is used for the transfer characteristics.

In addition, if HDR metadata, such as 'MDCV' and 'CLLI', exists in the item property container box, the HDR metadata can be used.

Figure 8:
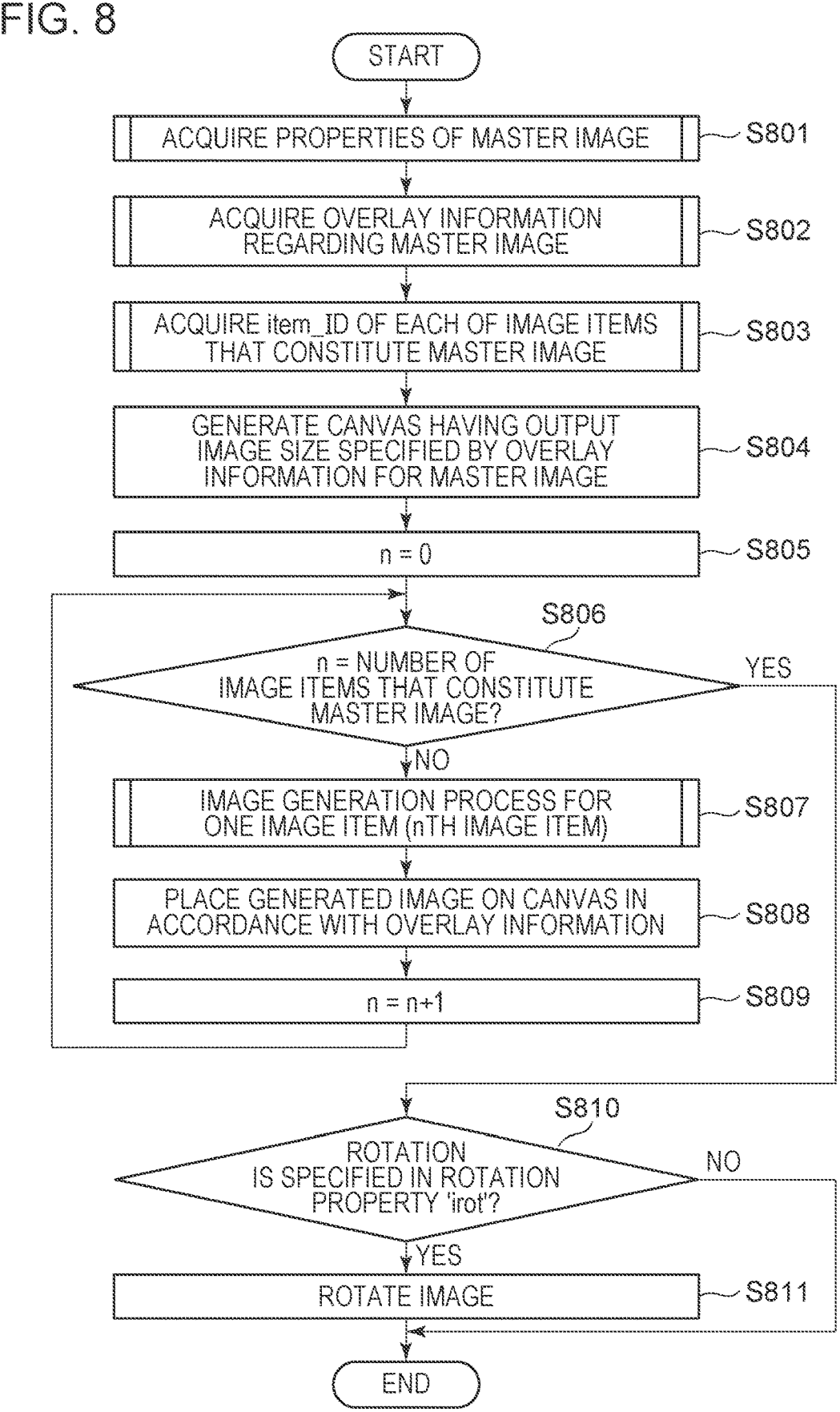
FIG. 8 is a flowchart illustrating an overlay image generation process.

The overlay image generation process is described below with reference to FIG. 8.

In step S801, the CPU 101 performs a property acquisition process on the overlay image. The process is described below with reference to FIG. 9.

In step S802, the CPU 101 performs an overlay information acquisition process on the overlay image. Since the overlay information is recorded in the 'idat' box, the data stored in the 'idat' box is acquired.

The overlay information includes the image size (an output_width parameter, an output_height parameter) of the overlay image, location information (horizontal_offset, vertical_offset) of each of the image items (the divided image items) that constitute the overlay image, and the like.

The overlay information is regarded as image item data of an image item having an item type of overlay 'iovl'.

Figure 10:
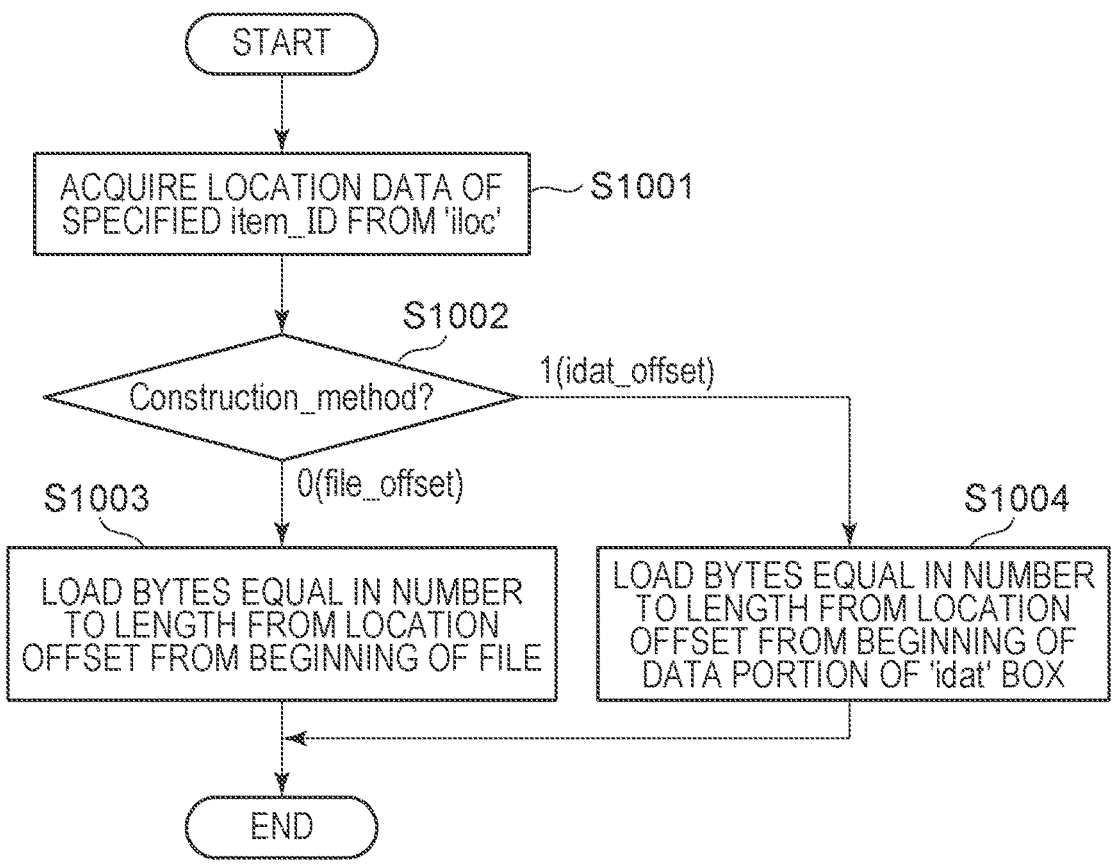
FIG. 10 is a flowchart illustrating a data acquisition process of an image item.

The acquisition process is described below with reference to FIG. 10.

In step S803, the CPU 101 performs an item ID acquisition process for all divided image items. This process is described below with reference to FIG. 11.

In step S804, the CPU 101 uses the overlay image size in the overlay information acquired in step S802 to reserve a memory for storing image data of that size. This memory area is referred to as a "canvas".

In step S805, the CPU 101 initializes the divided image counter n to 0.

In step S806, the CPU 101 checks whether the divided image counter n is equal to the number of divided image items. If the two are equal, the processing proceeds to step S2210. However, if the two are not equal, the processing proceeds to step S807.

In step S807, the CPU 101 performs the image generation process on one image item (the nth divided image item). This process is described below with reference to FIG. 12.

In step S808, the CPU 101 places the image (the divided image) of the nth divided image item generated in step S807 on the canvas reserved in step S804 in accordance with the overlay information acquired in step S802.

In the overlay, the divided images that constitute the overlay can be arranged at any locations on the canvas, and the locations are set forth in the overlay information. However, the outside of the overlay image is not displayed.

Therefore, when each of the divided images is arranged on the canvas, only an area of the coding area of the divided image that overlaps the area of the overlay image, that is, only the playback area of the divided image is arranged.

Figure 13:
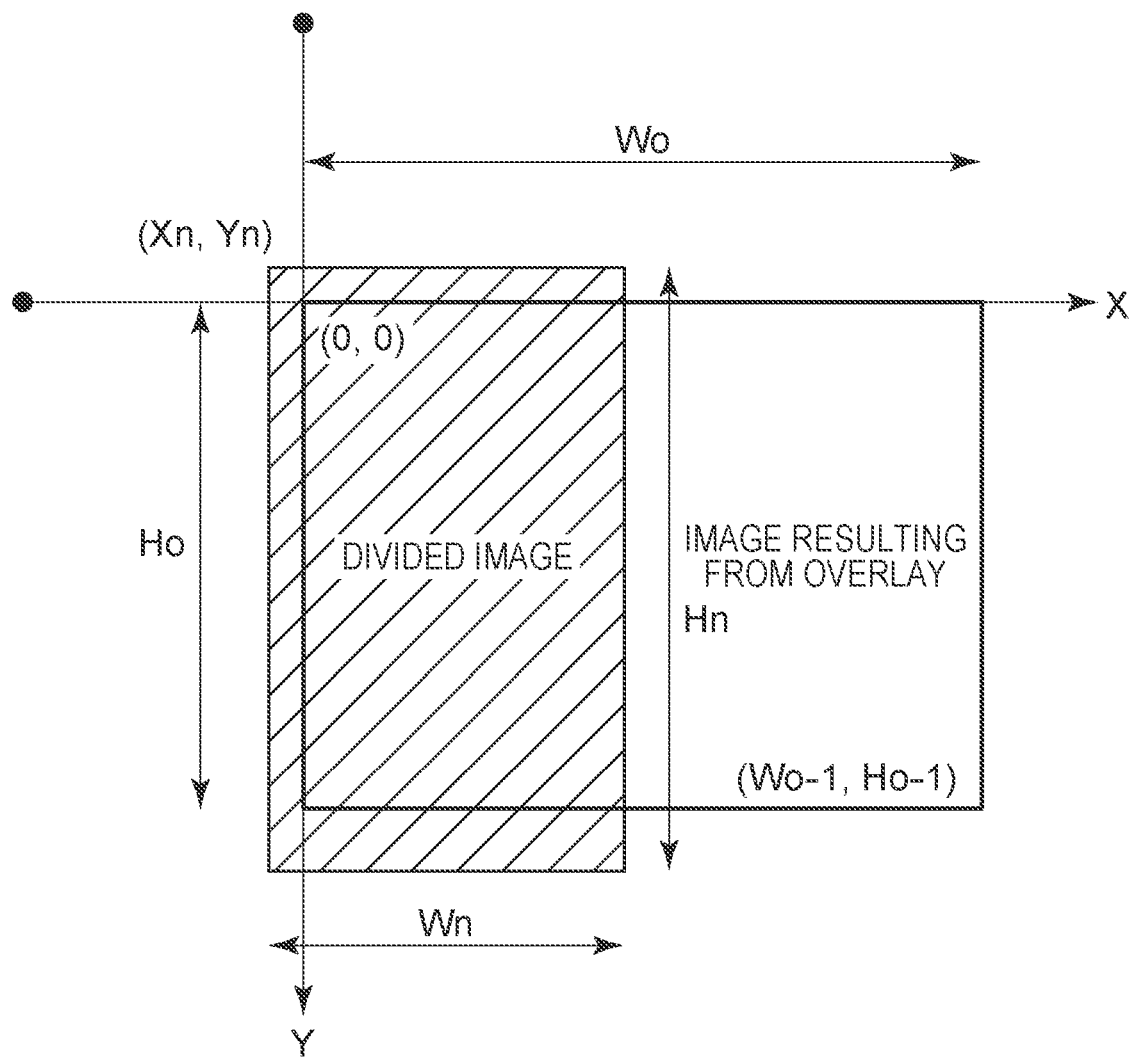
FIG. 13 is a diagram illustrating a location relationship between an overlay image and a divided image.

The process is described below with reference to FIG. 13.

The coordinate system is defined so that the upper left of the overlay image is the origin (0, 0), the X coordinate increases in the right direction, and the Y coordinate increases in the downward direction.

The size of the overlay image consists of width Wo and height Ho (0<Wo, 0<Ho).

Therefore, the coordinates for the upper left of the overlay image are (0, 0), and the coordinates for the lower right corner of overlay image are (Wo−1, Ho−1).

In addition, the size of the divided image consists of width Wn and the height Hn (0<Wn, 0<Hn).

Let (Xn, Yn) denote the location of the upper left of the divided image.

Then, the divided image has upper left coordinates of (Xn, Yn) and lower right coordinates of (Xn+Wn−1, Yn+Hn−1).

The overlapping area of the divided image with the overlay image (the canvas) can be obtained by a method described below.

In the following cases, there is no overlapping area:

Wo−1<Xn (the left end of the divided image is located to the right of the right end of the overlay image), Xn+Wn−1<0 (the right end of the divided image is located to the left of the left end of the overlay image), Ho−1<Yn (the upper end of the divided image is lower than the lower end of the overlay image), and Yn+Hn−1<0 (the lower end of divided image is higher than upper end of overlay image).

In these cases, the image is not subjected to the processing.

However, in the following case, the entire divided image becomes the overlapping area:

$$0 <= Xn \text{ and } (Xn + Wn - 1) <=$$
$$(Wo - 1) \text{ and } 0 <= Yn \text{ and } (Yn + Hn - 1) <= (Ho - 1).$$

In this case, the entire divided image is placed on the canvas at the specified location (Xn, Yn).

In the cases other than the above-described cases, part of the divided image is to be arranged. Let (Xl, Yt) denote the upper left coordinates of the overlapping area, and let (Xr, Yb) denote the lower right coordinates of the overlapping area. Then, the left end Xl is determined as follows:

$$\text{if } (0 <= Xn)$$
$$Xl = Xn;$$
$$\text{else}$$
$$Xl = 0;$$

The right end Xr is determined as follows:

$$\text{if } (Xn + Wn - 1 <= Wo - 1)$$
$$Xr = Xn + Wn - 1;$$
$$\text{else}$$
$$Xr = Wo - 1;$$

The upper end Yt is determined as follows:

$$\text{if } (0 <= Yn)$$
$$Yt = Yn;$$
$$\text{else}$$
$$Yt = 0;$$

The lower end Yb is determined as follows:

$$\text{if } (Yn + Hn - 1 <= Ho - 1)$$
$$Yb = Yn + Hn - 1;$$
$$\text{else}$$
$$Yb = Ho - 1;$$

The size of the overlapping area is defined by width Xr−Xl+1 and height Yb−Yt+1.

As described above, the upper left coordinates (Xl, Yt) and the lower right coordinates (Xr, Yb) of the overlapping area are coordinates defined by the coordinate system in which the upper left of the canvas is defined as origin (0, 0).

The upper left coordinates (Xl, Yt) of the overlapping area are expressed by the following coordinate system in which the upper left of the divided image is defined as the origin as follows:

$$Xl' = Xl - Xn; \text{ and}$$
$$Yt' = Yt - Yn;$$

The summary is given below.

A rectangle having a width of (Xr−Xl+1) and a height of (Yb−Yt+1) is cut out at the location a distance (Xl', Yt') away from the upper left of the divided image and is placed on the canvas at the location (Xl, Yt).

In this manner, the playback area of the divided image can be placed on the canvas at a proper location.

In step S809, the CPU 101 increments the divided image counter n by 1, and the processing returns to step S806.

In step S810, the CPU 101 determines whether the rotation property 'irot' exists in the properties of the overlay image acquired in step S801. If the rotation property exists, the CPU 101 examines the rotation angle. However, if the rotation property does not exist or if the rotation property exists but the rotation angle is 0, then the processing ends. If the rotation property exists and the rotation angle is other than 0, the processing proceeds to step S811.

In step S811, the CPU 101 rotates the canvas image generated in steps S806 to S809 by the angle acquired in step S810 and considers the image as the generated image.

In this manner, an overlay image is generated.

While the above description has been mage with reference to the processing of steps S806 to S809 repeated the number of times equal to the number of divided images, the processing of steps S806 to S809 may be performed in parallel the number of times equal to the number of divided images in a parallel processing enabled environment.

Figure 9:
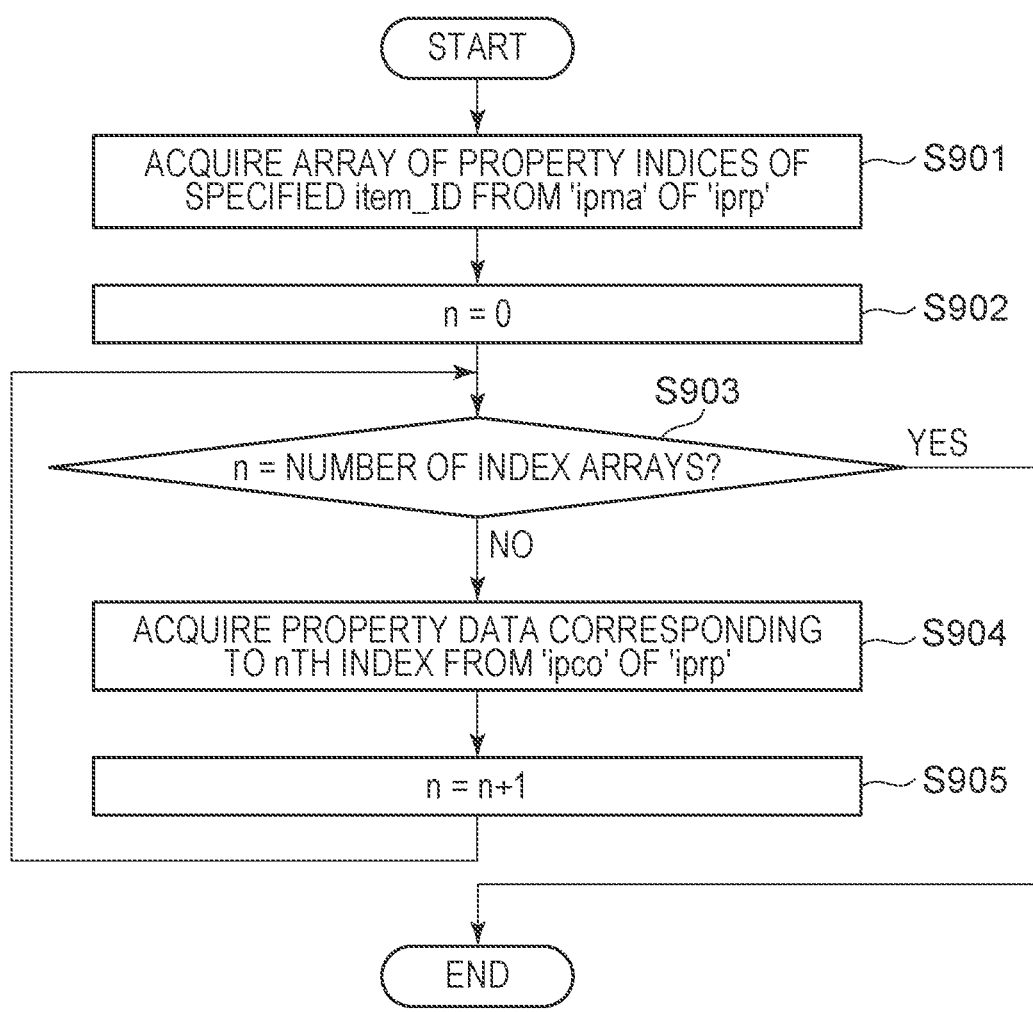
FIG. 9 is a flowchart illustrating a property acquisition process of an image item.

The image item property acquisition process is described below with reference to FIG. 9.

In step S901, the CPU 101 searches the item property association box in the item property box in the metadata box for the entry of the specified image item ID and acquires the array of property indices stored therein.

In step S902, the CPU 101 initializes the array counter n to 0.

In step S903, the CPU 101 checks whether the array counter n is equal to the number of array elements. If the two are equal, the processing ends. However, if the two are not equal, the processing proceeds to step S904.

In step S904, the CPU 101 acquires the property indicated by the index in the nth element of the array from the item property container box in the item property box in the metadata box.

In step S905, the CPU 101 increments the array counter n by 1, and the processing returns to step S903.

The image item data acquisition process is described below with reference to FIG. 10.

In step S1001, the CPU 101 searches the item location box in the metadata box for an entry of the specified image item ID and acquires the offset reference (construction_method), offset, and length.

In step S1002, the CPU 101 checks the offset reference acquired in step S1001. The offset reference of the value 0 indicates an offset from the beginning of the file, and the offset reference of the value 1 indicates an offset within the item data box. If the offset reference is 0, the processing proceeds to step S1003. However, if the offset reference is 1, the processing proceeds to step S1004.

In step S1003, the CPU 101 loads, into the memory 102, bytes equal in number to the length from the byte location offset from the beginning of the file.

In step S1004, the CPU 101 loads, into the memory 102, bytes equal in number to the length from the byte location offset from the beginning of the data portion of the item data box in the metadata box.

Figure 11:
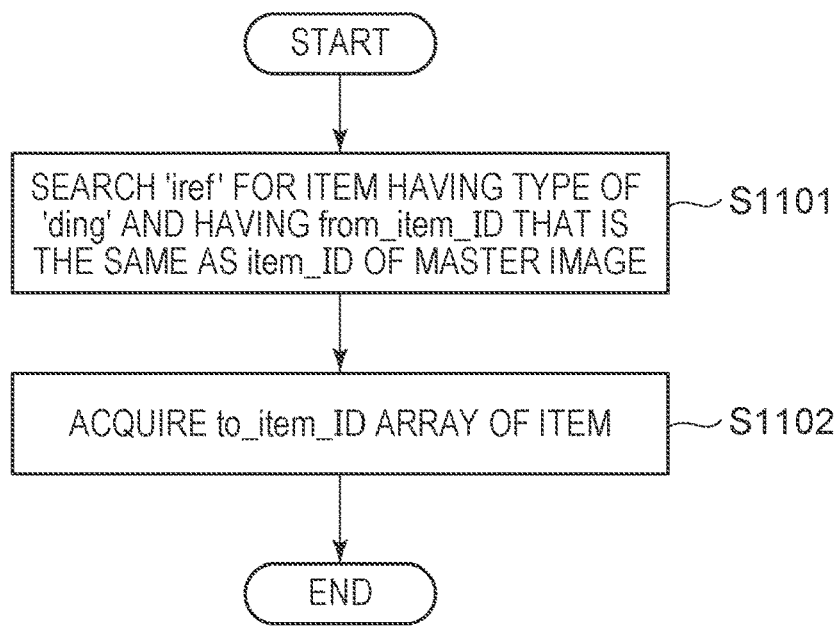
FIG. 11 is a flowchart illustrating an item ID acquisition process for images that constitute a master image.

The item ID acquisition process for the images constituting the master image is described below with reference to FIG. 11.

In step S1101, the CPU 101 searches the item reference box in the metadata box for an entry having a reference type of 'ding' and a referencing item ID that is the same as the item ID of the master image.

In step S1102, the CPU 101 acquires the array of referenced item IDs in the entry acquired in step S1101.

Figure 12:
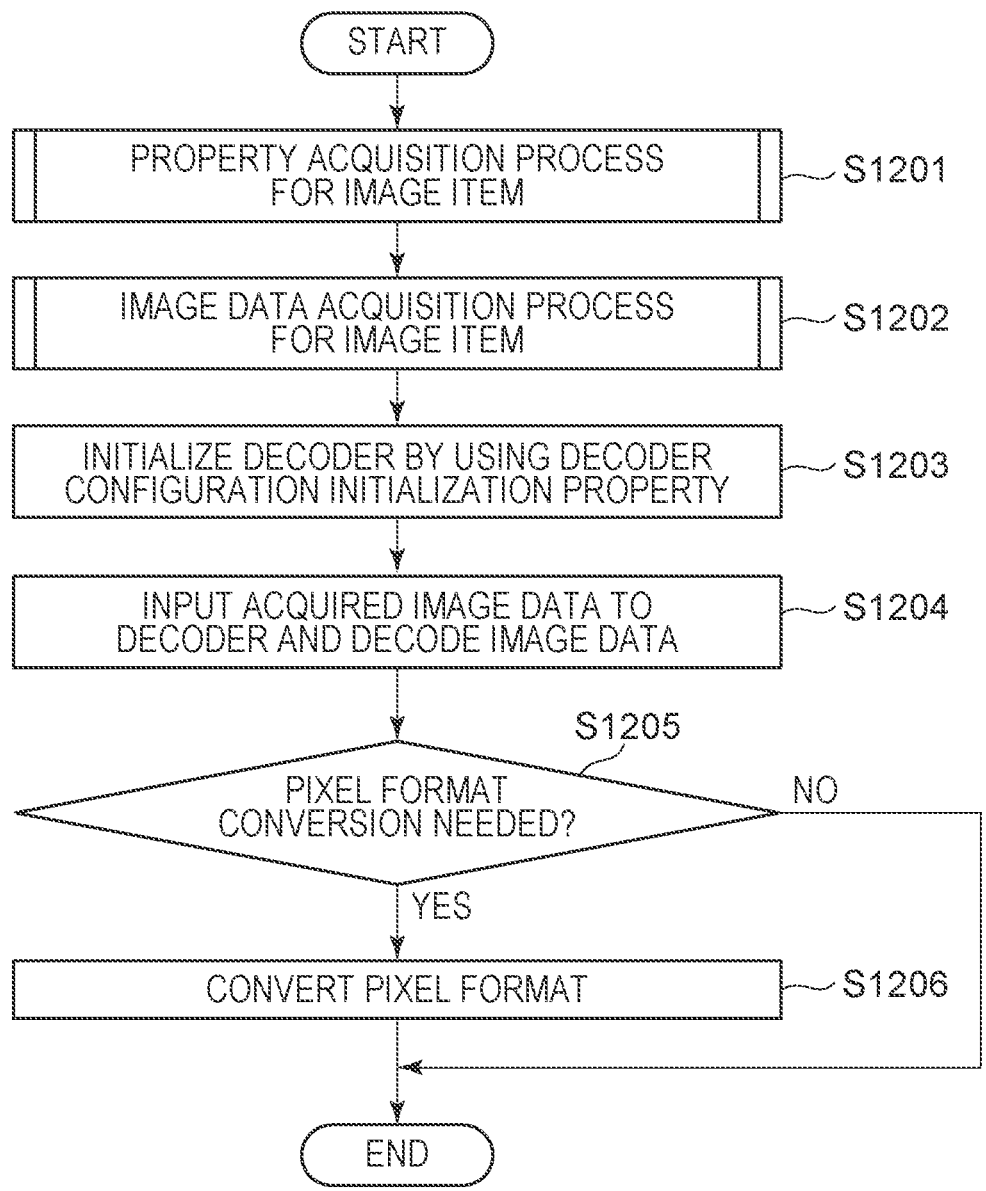
FIG. 12 is a flowchart illustrating an image generation process for one image item.

The image generation process for one coded image item is described with reference to FIG. 12.

In step S1201, the CPU 101 acquires the property of the image item. This step has already been described with reference to FIG. 9.

In step S1202, the CPU 101 acquires the data of the image item. This step has already been described with reference to FIG. 10. The data of the image item is coded image data.

In step S1203, the CPU 101 initializes the decoder by using the decoder configuration/initialization data, which is one of the properties acquired in step S1201.

In step S1204, the CPU 101 decodes the coded image data acquired in step S1202 with a decoder and acquires the result of decoding.

In step S1205, the CPU 101 checks whether pixel format conversion is needed.

If pixel format conversion is not needed, the processing ends. However, if pixel format conversion is needed, the processing proceeds to step S1206.

If the pixel format of the output data of the decoder and the pixel format of an image supported by the display device are different, pixel format conversion is needed.

For example, if the pixel format of the output data of the decoder is the YCbCr (luminance-color difference) format and if the pixel format of the image of the display device is the RGB format, pixel format conversion from the YCbCr format into the RGB format is needed. In addition, even when the two formats are the same YCbCr format, pixel format conversion is needed if the bit depths (8 bits, 10 bits, etc.) or color difference samples (4:2:0, 4:2:2, etc.) are different.

Note that because the coefficient used when the RGB format is converted into the YCbCr format is specified in the matrix coefficients of the color space information property 'colr', the reciprocal of the coefficient can be used to convert the YCbCr format into the RGB format.

In step S1206, the CPU 101 converts the decoder output data acquired in step S1204 into a desired pixel format.

In this way, the image of the specified coded image item can be generated.

Through the above-described processing, an HDR image recorded on the recording medium 120 in the HEIF format illustrated in FIG. 2 can be played back.

OTHER EMBODIMENTS

The functions of the above-described embodiments may be implemented as a control method, and the control method can be performed by an image processing device. Alternatively, a program having the functions of the above-described embodiments may be implemented as a control program, and the control program can be executed by a computer included in an image processing device. Note that the control program is recorded in, for example, a computer-readable nonvolatile recording medium.

A program that implements one or more functions of the above-described embodiments may be supplied to a system or device via a network or a recording medium, and at least one processor in the system or the device may read and execute the program. The present disclosure can be implemented by such a process. Alternatively, the present disclosure can be implemented by a circuit (for example, ASIC) that provides at least one of the functions.

According to the present disclosure, an image capture device that, when recording an image having a large amount of data and a high resolution, record an image in a recording form suitable for recording and playback can be provided. In addition, a display control device for playing back an image recorded in the recording form can be provided.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A recording device for recording HDR (high dynamic range) image data obtained through image capture, comprising:
a memory and at least one processor which function as:
a setting unit that sets a recording image size for recording HDR image data; and
a recording control unit that switches, in accordance with the recording image size set by the setting unit, between (1) dividing HDR image data obtained through image capture into a plurality of divided HDR image data, recording the plurality of divided HDR image data and, as a derived image item, image structure information for combining the plurality of divided HDR image data into image data before being divided, in an image file in a HEIF (High Efficiency Image File Format) format and (2) recording HDR image data obtained through image capture in an image file in the HEIF format without dividing the HDR image data obtained through image capture.

2. The recording device according to claim 1, wherein the setting unit sets the recording image size in accordance with an operation by a user.

3. The recording device according to claim 1, wherein, in a case where the HDR image data obtained through image capture is divided into the plurality of divided HDR image data, the recording control unit determines a size for the plurality of divided HDR image data in accordance with the recording image size set by the setting unit.

4. The recording device according to claim 1, wherein a size for the plurality of divided HDR image data differs depending on the recording image size set by the setting unit.

5. The recording device according to claim 1, wherein the recording control unit performs control so that the HDR image data obtained through image capture of which a size is larger than the recording image size set by the setting unit is recorded in the image file.

6. The recording device according to claim 1, wherein the recording control unit performs control so that the HDR image data obtained through image capture of which a size is larger than the recording image size set by the setting unit is divided into a plurality of divided HDR image data and is recorded in the image file and image structure information for combining the plurality of divided HDR image data into image data before being divided is recorded in the image file as the derived image item.

7. The recording device according to claim 1, wherein the recording control unit performs control so that the plurality of divided HDR image data and the image structure information are recorded in an overlay format of the HEIF.

8. The recording device according to claim 1, wherein the recording control unit performs control so that the plurality of divided HDR image data and the image structure information are recorded in a grid format of the HEIF.

9. The recording device according to claim 1, wherein the HDR image data is image data in which a bit depth is more than 8 bits.

10. The recording device according to claim 9, wherein the HDR image data is image data in which the bit depth is 10 bits.

11. The recording device according to claim 1, wherein the HDR image data is image data in which a color gamut is BT.2020.

12. The recording device according to claim 1, wherein the HDR image data is image data which is generated through an operation using a PQ gamma curve for image data obtained through image capture.

13. The recording device according to claim 1, wherein the recording control unit performs control so that the plurality of divided HDR image data and the image structure information are recorded in a single image file.

14. A method for controlling a recording device for recording HDR (high dynamic range) image data obtained through image capture, comprising:
a setting step that sets a recording image size for recording HDR image data; and
a recording control step that switches, in accordance with the recording image size set by the setting step, between (1) dividing HDR image data obtained through image capture into a plurality of divided image HDR data, recording the plurality of divided HDR image data and, as a derived image item, image structure information for combining the plurality of divided HDR image data into image data before being divided, in an image file in a HEIF (High Efficiency Image File Format) format and (2) recording HDR image data obtained through image capture in an image file in the HEIF format without dividing the HDR image data obtained through image capture.

15. A non-transitory computer-readable recording medium storing a program for causing a computer to perform the method for controlling the recording device according to claim 14.

* * * * *